United States Patent [19]
Reid et al.

[11] Patent Number: 5,065,856
[45] Date of Patent: Nov. 19, 1991

[54] APPARATUS AND METHOD FOR PACKAGING ARTICLES

[75] Inventors: Laurie M. Reid; Archie Koster, both of Casselberry; Gary D. Hunt, Longwood, all of Fla.

[73] Assignee: Simplimatic Engineering Company, Lynchburg, Va.

[21] Appl. No.: 365,207

[22] Filed: Jun. 12, 1989

[51] Int. Cl.⁵ ............................................. B65G 47/26
[52] U.S. Cl. ................................. 198/419.3; 198/458
[58] Field of Search .................... 198/419.3, 445, 446, 198/458

[56] References Cited

U.S. PATENT DOCUMENTS

| | | |
|---|---|---|
| Re. 27,977 | 4/1974 | Monaghan . |
| Re. 28,535 | 9/1975 | Ganz . |
| Re. 29,362 | 8/1977 | Reid . |
| 3,194,382 | 7/1965 | Nigrelli et al. . |
| 3,447,280 | 6/1969 | Cunningham et al. . |
| 3,540,187 | 11/1970 | Monaghan . |
| 3,660,961 | 5/1972 | Ganz . |
| 3,680,678 | 8/1972 | Ganz . |
| 3,711,957 | 1/1973 | Carver, Jr. . |
| 3,718,246 | 2/1973 | Dardaine et al. ............... 198/419.3 |
| 3,791,100 | 2/1974 | Monaghan . |
| 3,791,101 | 2/1974 | Monaghan . |
| 3,808,767 | 5/1974 | Reid . |
| 3,842,570 | 10/1974 | Monaghan . |
| 3,864,890 | 2/1975 | Ullman . |
| 3,866,386 | 2/1975 | Ganz . |
| 3,872,647 | 3/1975 | Langen et al. . |
| 4,215,525 | 8/1980 | Nigrelli . |
| 4,552,261 | 11/1985 | Raudat et al. . |
| 4,597,247 | 7/1986 | Johnson . |
| 4,609,101 | 9/1986 | Ullman . |
| 4,633,647 | 1/1987 | Ganz . |
| 4,642,967 | 2/1987 | Culpepper . |
| 4,663,914 | 5/1987 | Ganz . |
| 4,673,509 | 1/1987 | Raudat et al. . |
| 4,689,934 | 9/1987 | Ganz . |
| 4,691,606 | 9/1987 | Johnson et al. . |
| 4,733,518 | 3/1988 | Griesdorn . |
| 4,748,791 | 6/1988 | Langenbeck . |

FOREIGN PATENT DOCUMENTS

| | | | |
|---|---|---|---|
| 3029508 | 3/1982 | Fed. Rep. of Germany ... | 198/419.3 |
| 3151997 | 8/1982 | Fed. Rep. of Germany . | |
| 0638392 | 4/1962 | Italy .................................. | 198/419.3 |
| 0527093 | 10/1972 | Switzerland ..................... | 198/419.3 |
| 2090804 | 7/1982 | United Kingdom . | |
| 2131383 | 6/1984 | United Kingdom ............. | 198/419.3 |

Primary Examiner—D. Glenn Dayoan
Attorney, Agent, or Firm—St. Onge Steward Johnston & Reens

[57] ABSTRACT

An improved tray packer-shrink wrapper is provided in a preferred embodiment with a computer control to permit relatively efficient changeover from processing a batch of one product size to a batch of another product size. A servocontrolled pin grouper is provided wherein at least two sets of pins such as pins A and B are mounted on corresponding endless chains such as chains A and B, which endless chains are independently cyclable by corresponding independently controlled servomotors A and B. The pin sets are inserted into a row of articles positioned on a stationary deadplate, with one pin set leading a trailing pin set, and the leading pin set is accelerated with respect to the trailing pin set to separate articles downstream of the leading pin set into an article group, which separation operation is continuously carried out in a cyclical fashion to group articles from the row. The computer control can be readily reprogrammed to control servomotors A and B differently for different sized articles and articles groups. Also, a servocontrolled film feed device and a servocontrolled wrapping device responsive to the same computer control are provided.

24 Claims, 31 Drawing Sheets

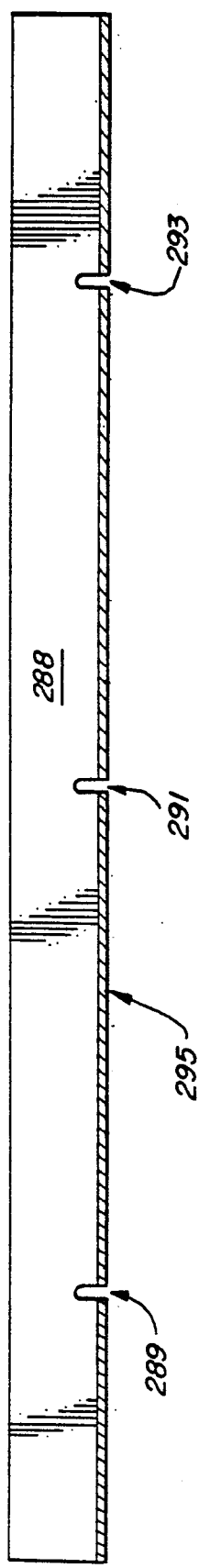

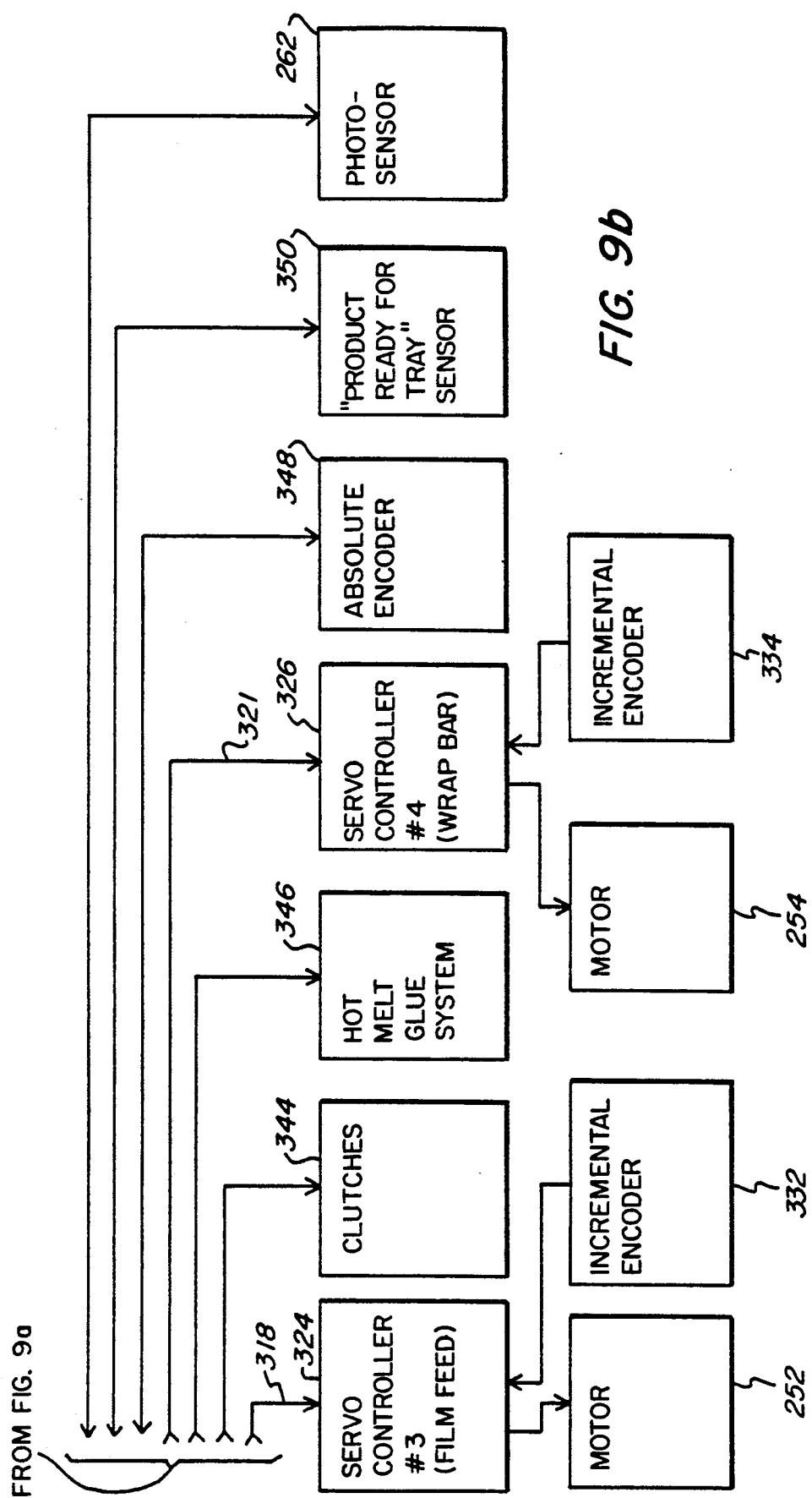

(STEP #8)

(STEP #9)

(STEP #10)

(STEP #16)

(STEP #18)

(STEP #22)

(STEP #24)

(STEP #26)

(STEP #32)

APPARATUS AND METHOD FOR PACKAGING ARTICLES

FIELD OF THE INVENTION

The present invention relates to packaging articles by means of a tray packing-shrink wrapping apparatus and method. More specifically, an apparatus and method are provided for an improved tray packing-shrink wrapping machine that is readily adjustable to accommodate successive batches of articles such as generally cylindrical containers, wherein the articles although of substantially uniform size such as height and diameter within any one batch may vary substantially in size from batch to batch.

BACKGROUND OF THE INVENTION

Tray packing-shrink wrapping packaging machines are well known in the prior art.

FIG. 1 shows in schematic fashion the function provided by such packaging machines. In FIG. 1, a bulk product infeed to be processed is indicated generally at 10 and typically includes cylindrically shaped article 12 usually standing on end, but otherwise generally randomly oriented. One example of such articles would be soft drink beverage cans, although other products such as jars, bottles, or other containers are typical, too. In the conventional prior art tray packing-shrink wrapping operation, bulk product infeed at 10 moves along a conveyor path indicated in succession by arrows 14, 16, 18, 20, and 22 to a number of workstation areas for processing as hereinafter described. At 24, the incoming bulk articles are laned into single file in parallel rows 26, 28, 30 and 32 as shown with individual articles such as for example 34, 36, and 38 in row 32 and generally touching each other along said rows such as 32 under the influence of normal line feed pressure exerted along the direction of arrow 16 by a routine line pressure source such as an infeed conveyor (not shown in FIG. 1). It is understood that the number of rows were chosen as being four for illustration purposes only, as other numbers of rows can be used as well. Laning is typically accomplished by introducing the bulk infeed to a plurality of spaced apart, parallel guide rails forming parallel channels therebetween.

After being laned into rows at 24, the articles are next formed into arrays or groups such as group 40 and group 42 of sixteen articles each in a matrix such as for example the 4×4 matrix at the grouping area 44. The two groups 40 and 42 are for illustration only, as it is understood that a continuous number of successive groups are generated.

After grouping at 44, the groups proceed in succession to area 46 where each group is loaded into its own tray 48. The tray loading operation typically includes loading the group onto a tray blank, which blank is folded, glued, and compressed to form tray 48.

After tray loading at 48, the tray loaded article group is wrapped in a generally rectangular sheet 50 of wrapping material at 52, such as for example 3 mil polyethylene film. Wrapping is usually accomplished by positioning what will later be referred to as the leading edge 54 of sheet 50 under tray 49 as shown near the leading edge 56 of tray 49, using a wrap rod (not shown in FIG. 1) to wrap sheet 50 around tray loaded articles 58 by pulling the trailing edge 60 of sheet 50 around articles 58 and positioning sheet trailing edge 60 to be tucked under the sheet leading edge 54 indicated at 62 as tray 49 moves forward. The ends of the wrapped package 58 are generally left open in a cross-machine or widthwise direction indicated by arrow 64.

After wrapping at 52, the package 58 is subjected to heating such as in a heat or shrink tunnel (not shown in FIG. 1) to shrink the polyethylene film snugly about the package 58 as indicated at 66, forming what is referred to as "bulls eyes" in either end such as at 68.

Machines for accomplishing such tray packing-shrink wrapping operations generally are well known. However, in actual practice it may become desirable to tray pack-shrink wrap a wide variety of articles having differing sizes, such as heights and diameters, from batch to batch. For example, the operator of a tray packer-shrink wrapper may wish to process a batch of cans such as 211×4 cans for an hour or two, then switch over to a batch of larger cans such as the size 300×407 for a subsequent time period, and so on for other differently sized batches.

When changeover from processing batches of one product size to another is required, prior art tray packing shrink wrapping machines can require substantial, tedious, and time consuming manual adjustments and changeout of physical parts. For example, one known machine uses a pair of servomotors controlled by microprocessor-based control modules to operate the grouper section 44 and also another servomotor to operate a film feed section at 52, where the polyethylene sheet is fed to the wrapping operation. However, changeover from one product or article size to another is still relatively time consuming. For example, in this prior art machine the grouping system consists of a sliding mechanism to which the articles to be grouped are fed. As the sliding mechanism oscillates backwards and forwards, a collating comb is alternately lowered and raised so that the comb alternately releases a group and then holds back the main product infeed. The raising and lowering of the comb is controlled by a programmable controller, while the movement of the sliding mechanism is controlled by a servomotor to follow a predetermined acceleration/deceleration curve whose form depends upon the system format. However, if there is a changeover involving a change of product diameter, then the comb will need to be changed as well as adjusting the spacing between guide rails to match the new comb. This can be a cumbersome and tedious procedure. Also, the film wrapping rod for carrying the film around the package as shown at 52 receives the film sheet under control of the film feed servomotor, but the rod follows a path that must be manually set by means of a handwheel to suit differing products heights. This manual operation can also introduce inefficiencies.

SUMMARY OF THE PRESENT INVENTION

In a preferred embodiment the present invention provides apparatus for and method of tray packing-shrink wrapping that readily and efficiently accepts batches of different size product with less time consuming and tedious manual adjustments between batches than a conventional machine.

In a particularly preferred embodiment, a computer control means controls the operation of a tray packer-shrink wrapper, which includes an adjustable pin grouper, an adjustable sheet feeding device, and an adjustable wrapping device all under control and synchronized by said computer control means. Input means such as a keyboard is provided for use by an operator in inputting information establishing among other things the size of the articles in the product to be processed and the number of articles per group.

The pin grouper of the present invention is particularly advantageous, in that a pair of servocontrolled independently movable pin sets A and B alternately sweep product groups in a cyclical fashion over a stationary deadplate, thereby affirmatively forming groups by pulling a gap while retaining the remaining product infeed at standard machine speed. When different product diameters are introduced, the deadplate is simply manually changed to a correspondingly sized deadplate, and the cyclical motion of pin sets A and B is changed by selecting a different program or moveset through the servocontrollers. Also, the two servomotors operating the film feed and wrapping devices are programmed to cooperate in a fashion that permits ready change of product sizes.

It is an object of the present invention to provide apparatus for and method of tray packing-shrink wrapping wherein different batches of product having articles of different sizes from batch to batch can be efficiently tray packed and shrink wrapped.

It is a further object of the present invention to provide apparatus for and method of tray packing-shrink wrapping wherein the number of changeout parts for processing different product batches with articles of different size from batch to batch is reduced.

It is a further object of the present invention to provide an improved apparatus for and method of tray packing-shrink wrapping controlled by computer means to facilitate the changeover from one product batch to another of different article sizes to be packaged.

Further objects and advantages of the present invention will become apparent from the following description of the drawings and the preferred embodiments.

BRIEF DESCRIPTION OF THE DRAWINGS

FIG. 8b is a view of the knife member associated with FIG. 8a;

FIGS. 9a and 9b are schematic block diagrams for the electronic controls of the present invention;

DETAILED DESCRIPTION OF THE PREFERRED EMBODIMENT

Figure 1:
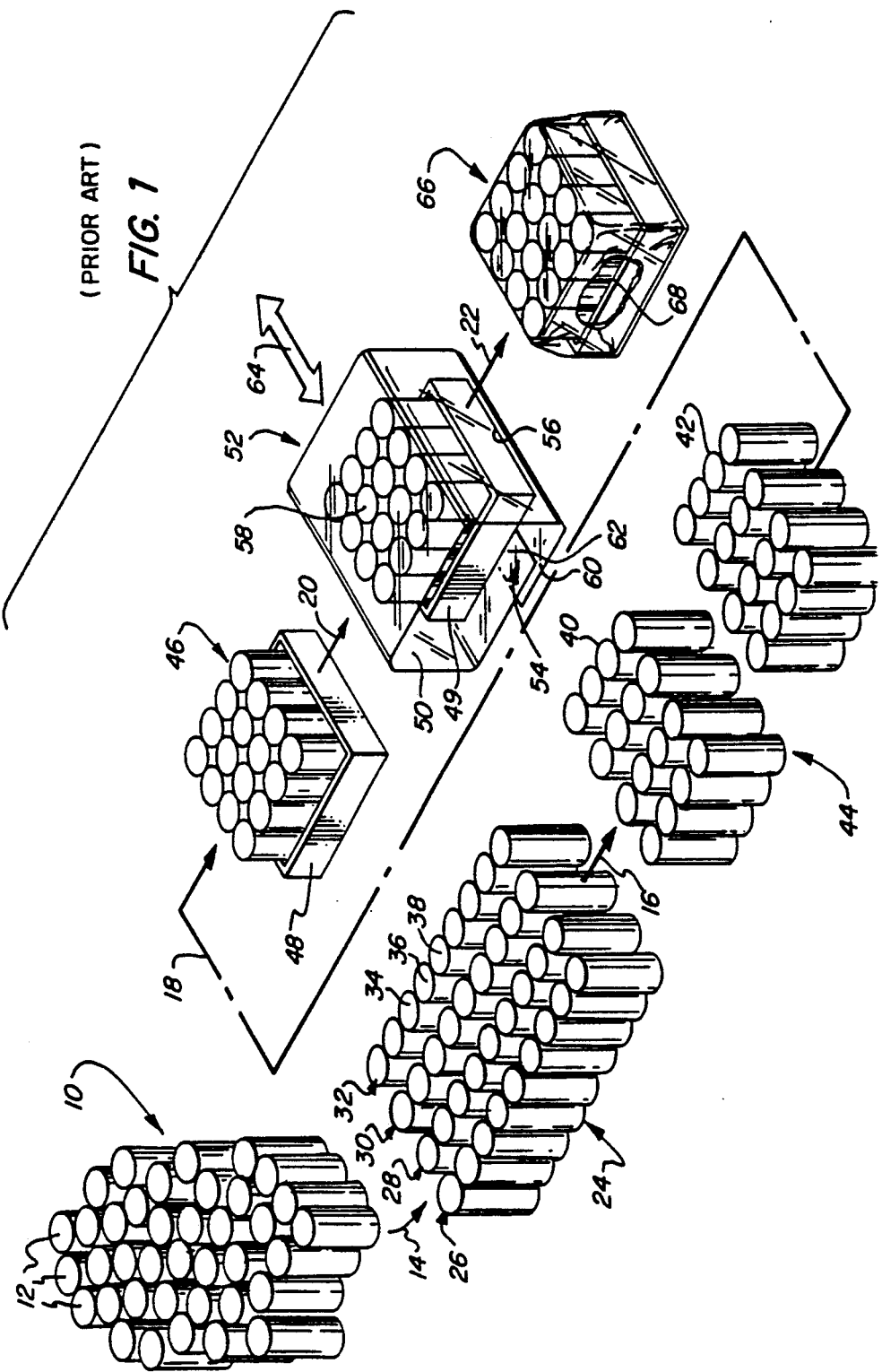
FIG. 1 is a schematic representation of the typical, prior art tray packing-shrink wrapping operation.

FIG. 1 as already described above depicts the typical tray packing-shrink wrapping operation that is to be accomplished in an improved fashion by the apparatus and method of the present invention for batches of different sized products.

Figure 2:
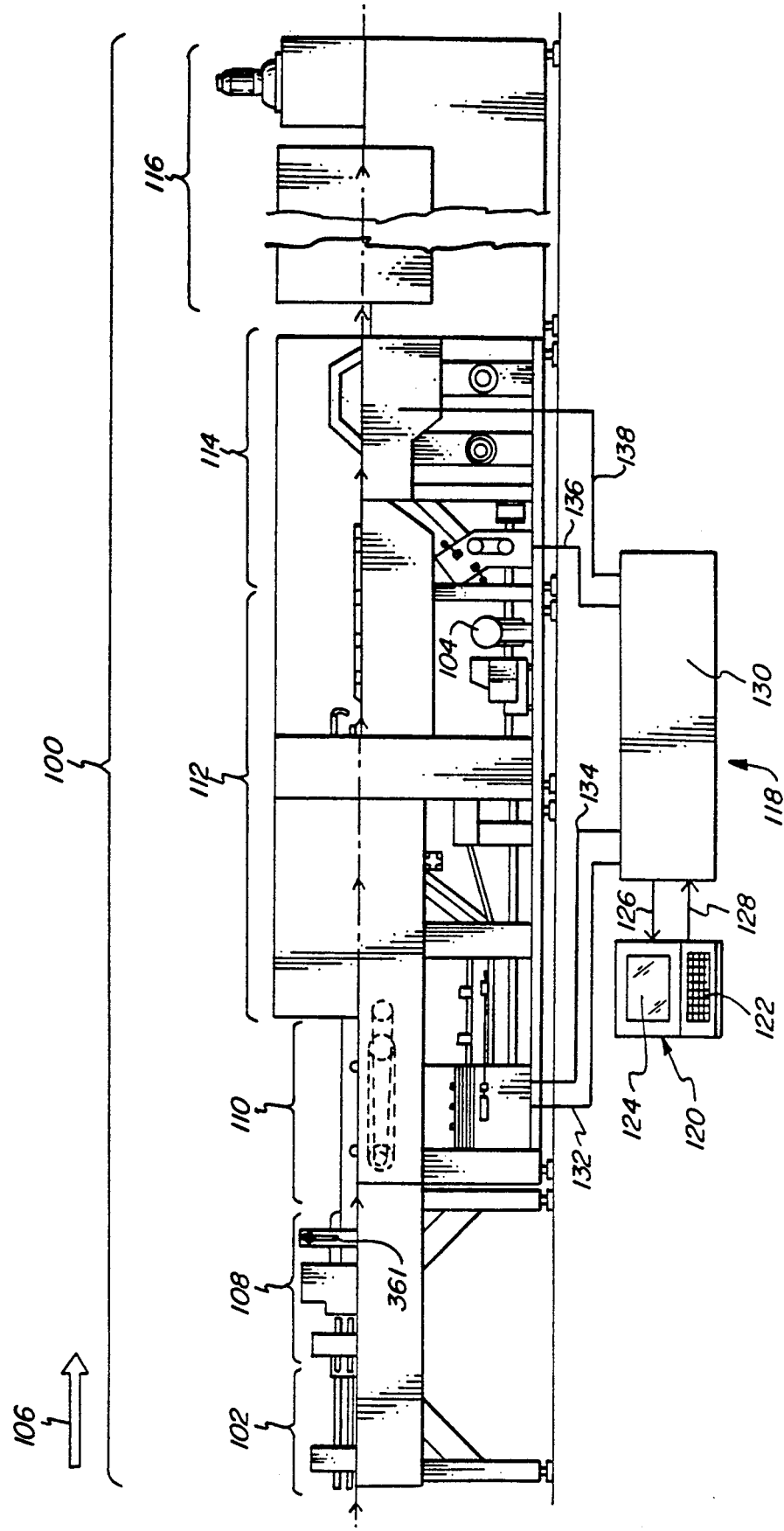
FIG. 2 is a schematic representation in side view of the tray packing-shrink wrapping apparatus of the present invention.

FIG. 2 provides a schematic representation of the apparatus 100 of the present invention, the general function of which can be understood by reference back to FIG. 1 for the general nature of the operations that are carried out at each section of apparatus 100.

The main conveyor infeed portion 102 of apparatus 100 corresponds approximately to figure number 10 of FIG. 1, where articles are received in bulk, usually standing on end but otherwise in random placement, for processing. It is understood that infeed portion 102 may be connected to an additional input conveyor for receiving articles from a suitable source thereof. Main conveyor infeed section 102 is typically a routine endless belt or chain type conveyor with a suitable prime mover such as main drive motor 104 for transporting articles thereon from a generally upstream towards a generally more downstream position as indicated by arrow 106. Main conveyor infeed section 102 represents one source of line feed pressure that urges articles downstream, although other conveyors upstream of said section 102 may also have the same effect. The product, or article, being processed proceeds generally in the direction of arrow 106 at an average speed generally referred to as machine speed SM, although it is understood that articles may be temporarily accelerated and/or decelerated at one section or another for the appropriate process step. Conveyor infeed speed is preferably slightly greater than the tray packer-shrink wrapper machine speed SM to generally assure a supply of product.

Figure 4:
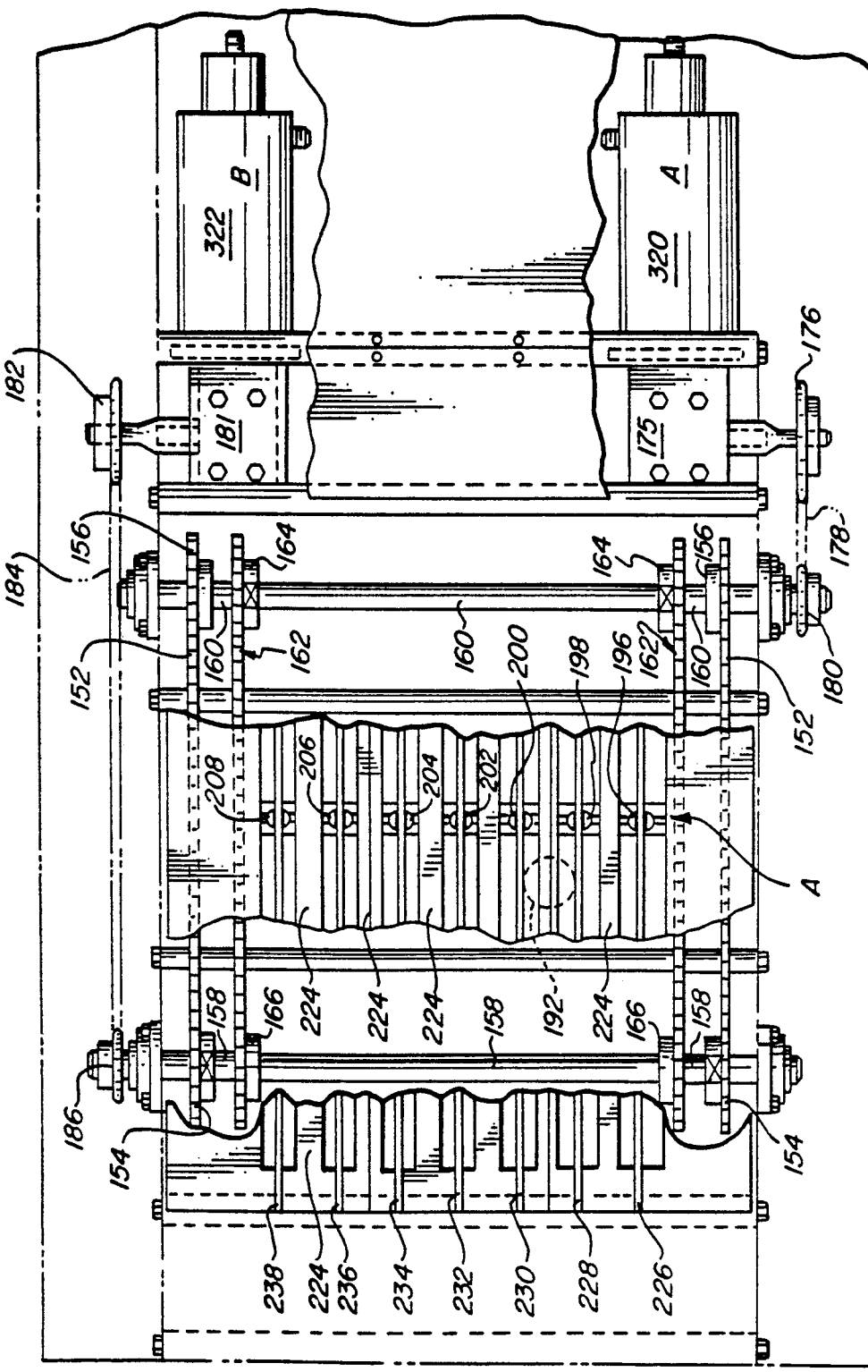
FIG. 4 is a top view of the pin grouper of FIG. 3.

The laning section 108 of apparatus 100 corresponds to figure number 24 of FIG. 1 wherein the articles are formed into rows by being urged into channels formed by a plurality of spaced apart lane guides or rails, which are described in further detail below with respect to FIGS. 4 and 5.

The operation carried out at pin grouper section 110 of FIG. 2 corresponds generally to figure number 44 of FIG. 1, where the articles after being laned into rows are grouped in accordance with the present invention. Grouper section 110 is described in further detail below with respect to FIGS. 3, 4 and 5.

The tray loading, gluing, and compression section is indicated generally at 112 and corresponds to figure number 46 of FIG. 1. Section 112 comprises standard, well known devices and forms no part of the present invention.

The film feeding and wrapping section is indicated generally at 114 and described in further detail below with respect to FIGS. 6, 7, 8a, and 8b. The operation carried out at section 114 corresponds generally to figure number 52 of FIG. 1.

The shrink tunnel is indicated at 116 and corresponds to figure number 66.

The control means is indicated generally at 118 and in the preferred embodiment includes a suitable type of central processing unit such as for example a standard personal computer 120 with keyboard 122 and CRT screen 124. It is of course understood that other input-/output devices such as for example touchscreens, track balls, light pens, and mice could be used. In the preferred embodiment a personal computer such as PC 120 communicates through lines 126 and 128 with a programmable logic controller or PLC 130, which in the preferred embodiment is a standard four axis controller by Allen Bradley, Model No. PLC 5. As further described below, the four axes of pLC 130 under direction of PC 120 correspond to first and second servomotors 320 and 322 for pin grouper control along lines 132 and 134 (see FIGS. 4 and 9), a third servomotor 252 for the film feed control along line 136 (see FIGS. 6 and 9), and a fourth servomotor 254 for wrap bar control along line 138 (see FIGS. 7 and 9).

Figure 3:
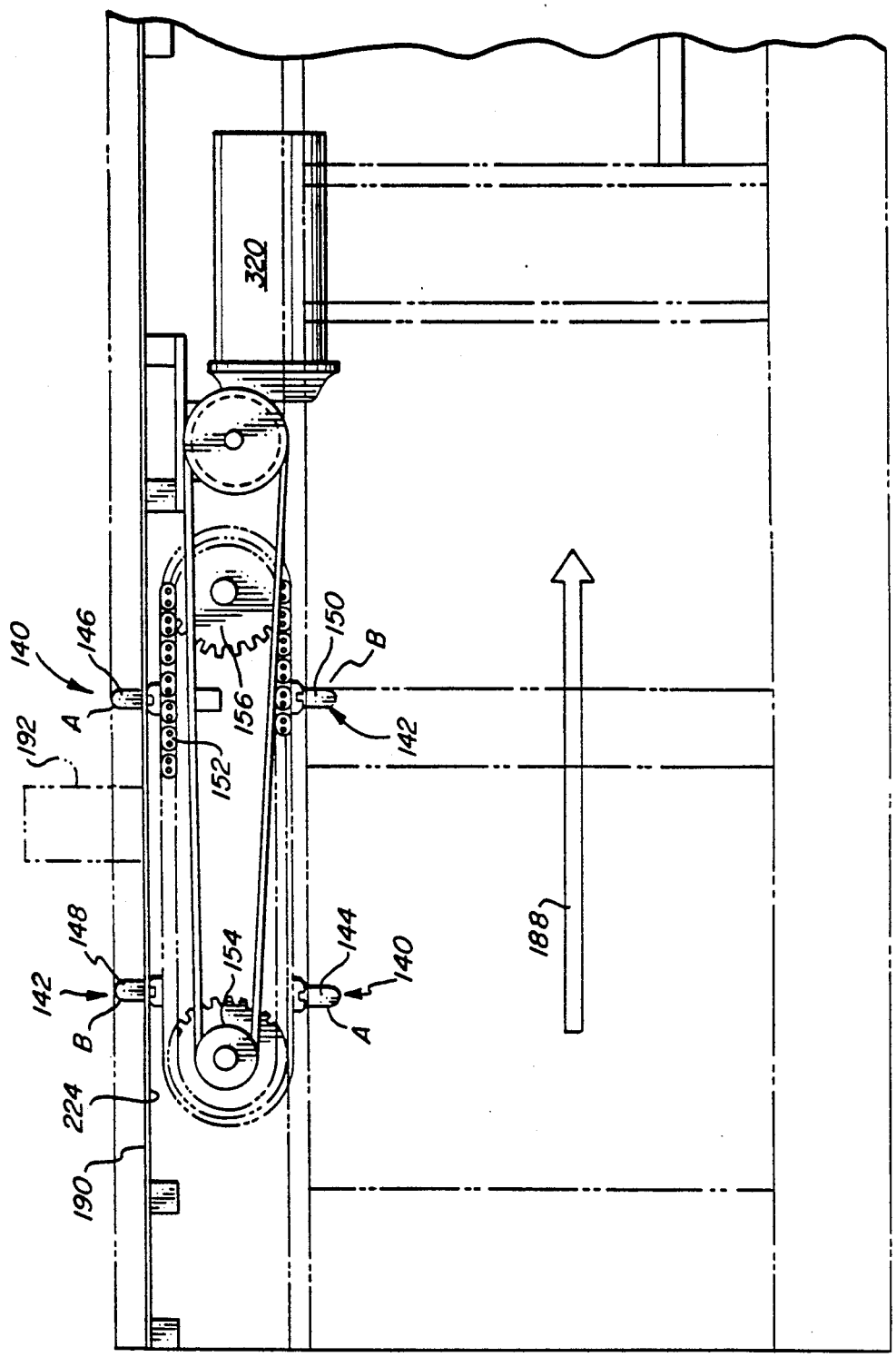
FIG. 3 is a side view of the pin grouper of the present invention.

The structure of the pin grouper section 110 is shown in more detail in FIGS. 3 (partial side view), 4 (partial top view), and 5 (sectional end view), wherein superfluous details have been eliminated to more clearly show the essential structure. In the preferred embodiment, two sets of pins are employed, the A set and B set indicated generally at 140 and 142. Each set preferably has two pins, such that the A set has pins 144 and 146 and the B set has pins 148 and 150. The A set 140 is mounted on a first endless A chain means such as a chain pair 152 (left and right) mounted in a loop around sprocket pairs 154 and 156 (left and right) further mounted on transverse shafts 158 and 160. The B pin set 142 is mounted on a second endless B chain means such as a chain pair 162 (left and right) mounted in a congruous loop around corresponding sprocket pairs 164 and 166 (left and right) appropriately mounted on transverse shafts 158 and 160. It is understood that the pins can also be any suitably shaped finger means for projecting into the row of articles.

Servomotor A indicated at 320 is for driving first endless A chain means such as chain pair 152 in an endless loop or circuit through routine mechanical linkage members 175, 176, 178, and 180. There is a second servomotor or servomotor B indicated at 322 for driving the second endless B chain means such as chain pair 162 likewise in a corresponding endless loop or circuit through suitable corresponding mechanical linkage members 181, 182, 184, and 186. Servomotors A and B are independently programmable as described below to drive chains A and B in different speed patterns, but in a timed relationship to each other.

Pins A and B are driven by servomotors A and B around a closed pin path portion defined by chains 152 and 162, wherein the pins move in a generally downstream direction for the top part of the path as indicated by arrow 188. A segment of the pin path is aligned with the conveyor path 190 whereon the articles to be grouped are positioned on end as shown in phantom for one article only at 192. By reference to FIGS. 13*a-i* below, a further schematic depiction of how the articles interact with the pin sets A and B can be seen.

It is understood that the number of chains is not limited to two, but could be two or more with one servomotor per chain. It is further understood that the number of pins per chain is not limited to two, but could be one or more.

Figure 5:
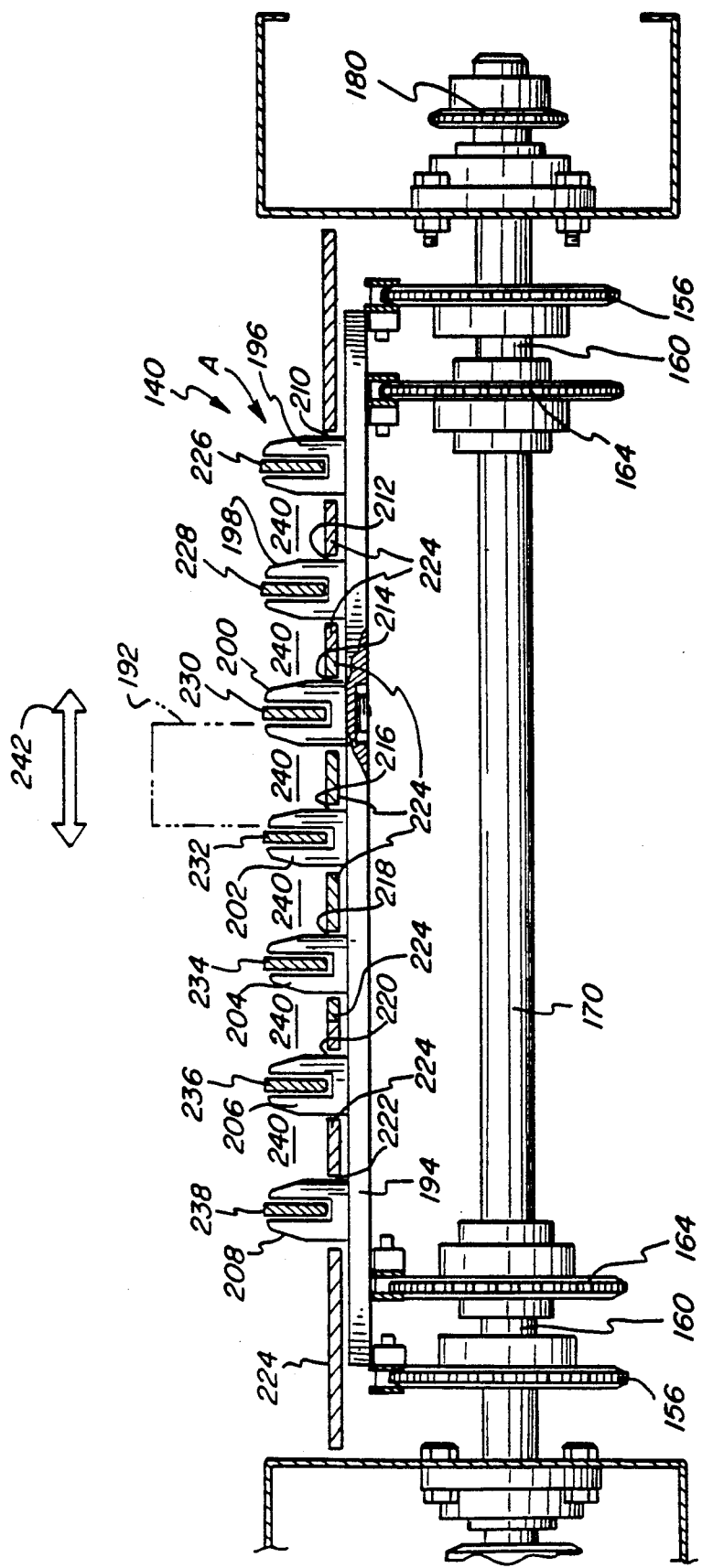
FIG. 5 is a sectional end view of a section of the pin grouper of FIGS. 3 and 4.

The pins A and B also extend widthwise of the conveyor and are mounted on a cross bar member 194 as shown for one set of pins A in FIG. 5, wherein a total of seven pins A at 196, 198, 200, 202, 204, 206, and 208 are shown in a widthwise direction. Pins B (not shown in FIG. 5) are likewise in a matching configuration. Pins 196–208 extend upwardly through corresponding lengthwise slots 210, 212, 214, 216, 218, 220, and 222 in a removable deadplate 224 that forms the floor of the conveyor path in the region of the pin grouper section 110. Deadplate 224 is a stationary plate means that is held relatively fixed and therefore cannot impart any downstream impelling force to articles setting thereon. As further described below, deadplate 224 is removable as a changeover part for reconfiguring the pin grouper 110 to handle different articles sizes.

Parallel spaced apart lane guides 226, 228, 230, 232, 234, 236, and 238 have sidewalls for forming parallel channels 240 spaced widthwise of the conveyor path for receiving articles in bulk under line feed pressure to lane, or row, the articles. The pins 196–208 are in the preferred embodiment U-shaped to extend upward through slots 210-222 in deadplate 224 and around lane guides 226-238, so that each pin has a sweeping action in two adjacent lanes. The pins have a length for extending between adjacent articles in a row and engaging said articles to either push articles downstream as said pins are moved downstream, or restrain articles upstream of said pins from being pushed further downstream by line feed pressure.

Hereinafter, it is understood that a general reference to pins A or pin A can refer specifically to either pin 144 or pin 146, and that a general reference to pins B or pin B can refer specifically to either pin 148 or pin 150. It is further understood that a general reference to pins A or pin A includes all pins in a widthwise direction as well. Merely for simplicity's sake, all the widthwise pins are not shown for example in the schematics of FIG. 13. It is further understood that the number of pins (herein, seven) shown in the preferred embodiment is illustrative only, and that other pin numbers can be chosen so long as there is a suitable correspondence between pins and lanes.

The deadplate 224 with lane guides 226-238 welded thereto is a changeout part that must be lifted out of position and replaced with another deadplate having matching longitudinal slots and lane guides when the tray packer-shrink wrapper is reconfigured to run differing batches of differing article diameters. The pins 196-208 are so mounted on cross bar member 194 to be adjustable in a widthwise direction.

The significance of the structure of the pin grouper will be further apparent from the description of the operation of the grouper with respect of FIGS. 11, 13, and 15 below.

Figure 6:
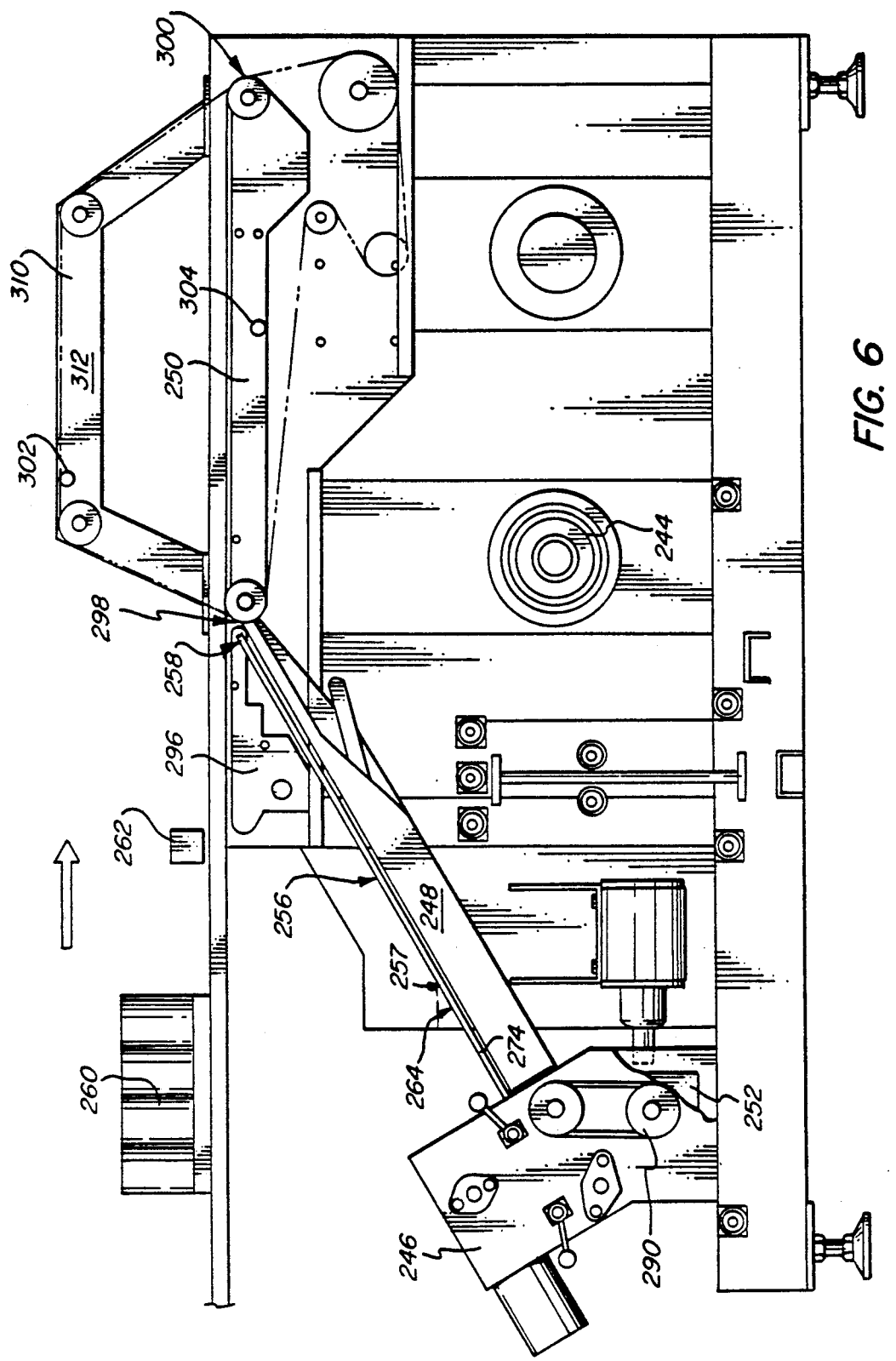
FIG. 6 is a side view of the film sheet feeding and wrapping apparatus of the present invention.
Figure 7:
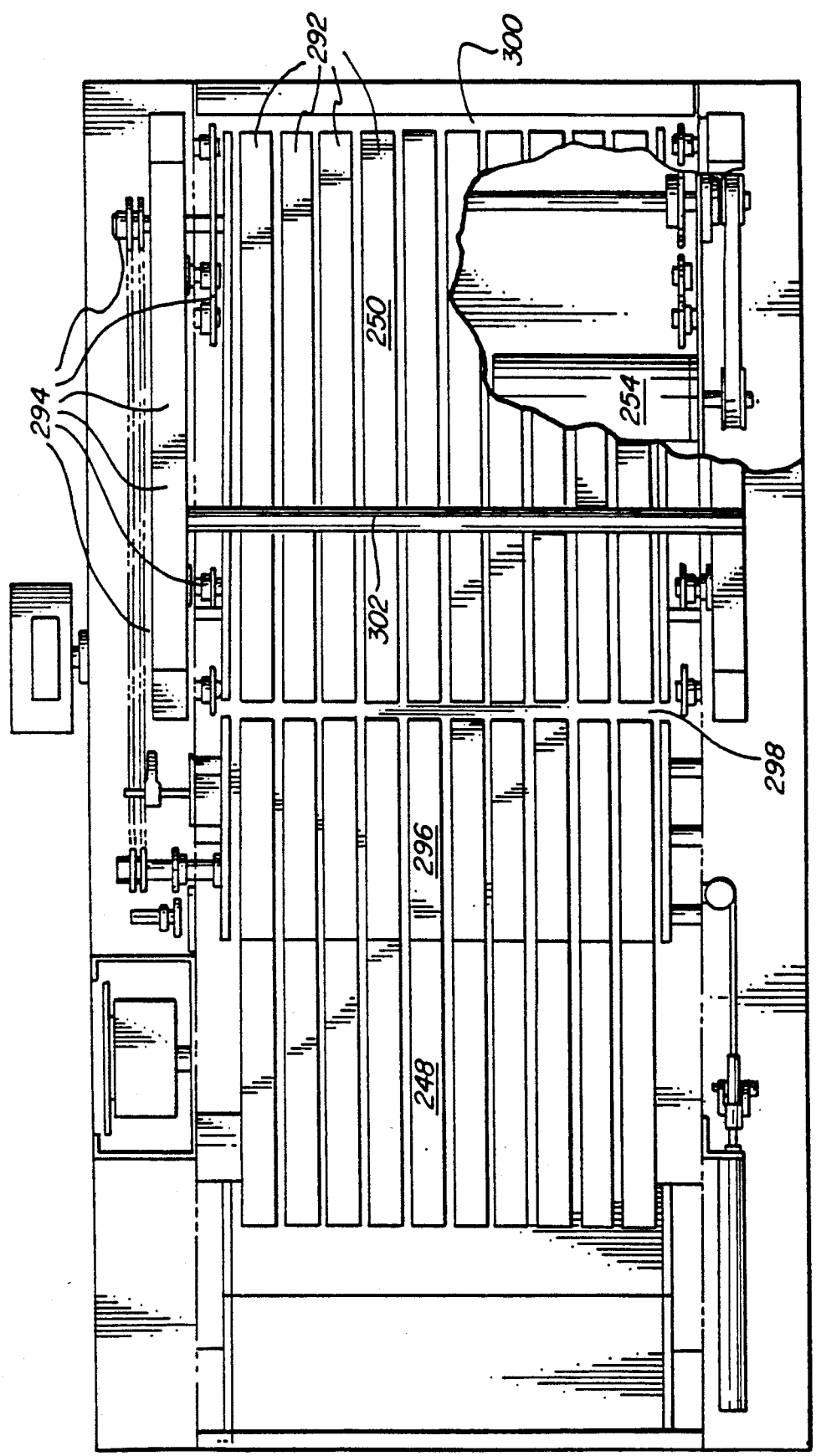
FIG. 7 is a top view of the wrapping apparatus of the present invention.

The film feeding and wrapping section 114 are shown in FIGS. 6, 7, 8*a* and 8*b*. In FIG. 6, a roll 244 is provided for receiving a spool of wrapping material such as 3 mil polyethylene sheet. The leading edge of the spool is threaded through film feed and shearing device 246 (shown in further detail in FIG. 8*a*) and up the inclined vacuum table 248 to the wrapping conveyor 250, wherein a group of articles loaded in a tray are wrapped as shown at generally 52 in FIG. 1. The film feed is driven by servomotor 252, whereas the wrapping operation is driven by servomotor 254 (see FIG. 7).

With reference now to the film feeding and shearing device 246, the objective is to position a generally rectangular sheet of film on vacuum table 248 as indicated generally at 256 with the leading edge 258 of the sheet positioned just below the wrapping conveyor 250 to wait for a tray loaded group of articles 260 being conveyed downstream to be detected by a sensing means such as for example photosensor 262, thereby initiating the wrapping operation as further explained below. Sheet 256 is perforated, or only partially cut, in a transverse direction at point 264 for permitting complete separation of a single sheet from the main supply roll during the wrapping operation.

Figure 8A:
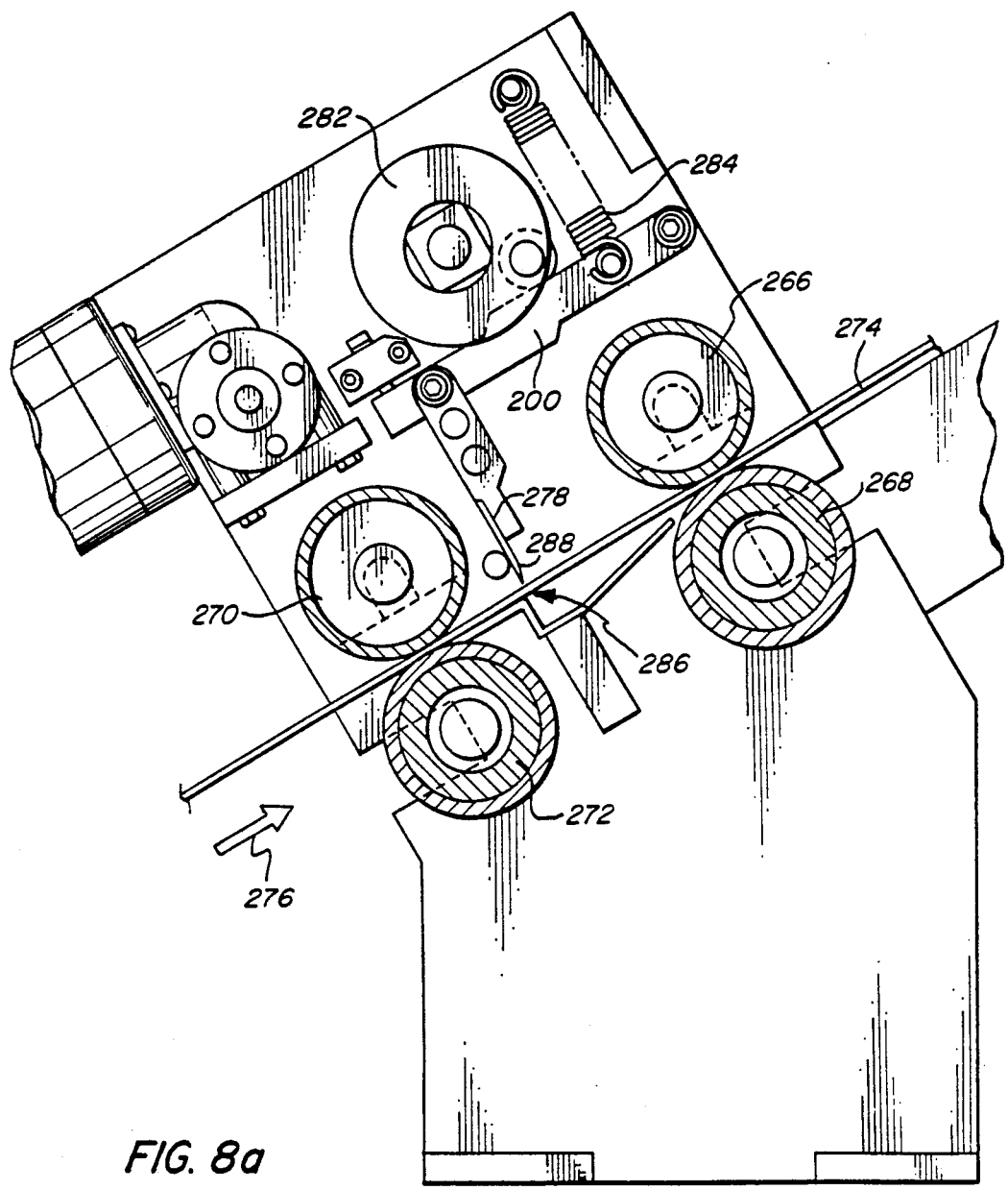
FIG. 8a is a side view of one aspect of the film sheet feeding and shearing apparatus of the present invention.

With reference now to FIG. 8a, further detail of the film shearing mechanism is shown. Pinch roller pair 266 and 268 as well as pinch roller pair 270 and 272 grip continuous sheet 274 in the nips thereof and pull sheet 274 in the direction of arrow 276 from a continuous roll or supply thereof (not shown in FIG. 8a) by rotating in a cooperative fashion. Servomotor 252 drives pinch rollers 266, 268, 270, and 272. The diameters of rollers 266 and 268 are slightly larger than the diameters of rollers 270 and 272 so as to stretch the sheet 274 slightly in the region of reciprocating knife member 278 to thereby facilitate the perforating operation. At an appropriate time, as will be described in further detail below, knife member 278 is activated in a back and forth motion by lever 280, cam wheel 282, and spring 284 to perforate the sheet at point 286. Knife blade 288 is notched along its cutting edge 295 as shown in FIG. 8b at 289, 291, and 293 to leave adjacent film sheets connected by thin strips of film to form wide perforations, rather than cut the film completely. As described below, the film sheets are pulled apart to separate from each other by the action of the wrap bar.

Servomotor 252 under computer control as described below also operates the vacuum table conveyor belts 248 through a suitable mechanical arrangement 290 to further feed the sheet up the incline into position for wrapping.

The wrapping operation is carried out by servomotor 254 in response to computer control as further described below. The wrapping device itself is a standard, well known device including wrapping conveyor 250 comprising a series of parallel spaced apart endless belts 292 suitably mounted in a standard configuration operated by means of routine pulley, roller, and belt combinations indicated generally at 294.

As is well known in the wrapping art, wrapping conveyor 250 is preceded by a standard input conveyor 296 spaced apart from conveyor 250 by a widthwise oriented first input passageway 298 through which a wrap bar described below carrying a film sheet such as 256 in FIG. 6 or sheet 50 in FIG. 1 is fed up from vacuum table 248 to the wrapping conveyor. Also, as is well known in the art, at the output end of wrapping conveyor 250 there is positioned a second or output widthwise passageway 300 through which the wrap bar described below travels in wrapping the package.

By reference to FIG. 6, a side view is shown of the wrapping mechanism. A plurality of wrap bars, here by way of example only two bars 302 and 304, extend widthwise across the width of the conveyor as shown for example by bar 302 in FIG. 7 for engaging the sheet of film to carry it around the package being wrapped. Bars 302 and 304 move around a wrap bar path indicated by line 310 supported on truss 312 to completely encircle the wrapping conveyor 250 and any packages thereon. Servomotor 254 under computer control directs the speed at which these wrap bars traverse the wrap bar path.

The manner in which the wrapping conveyor and wrap bars cooperate to wrap the package is generally known in the art; however, the velocity profile of the wrap bar motion as coordinated with the film feed device is described below with respect to the operation of the machine of the present invention.

Figure 9A:
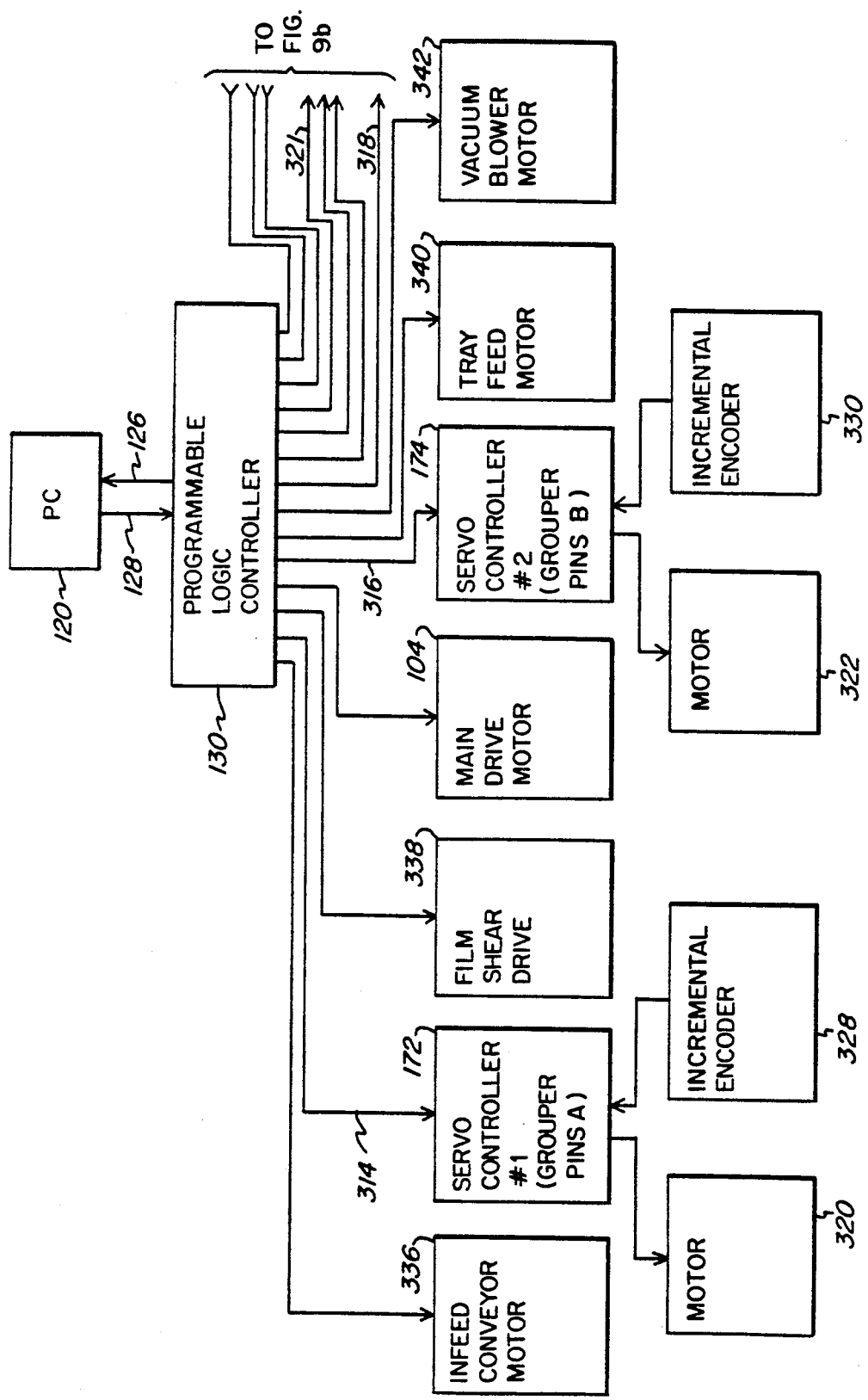
Figure 10A:
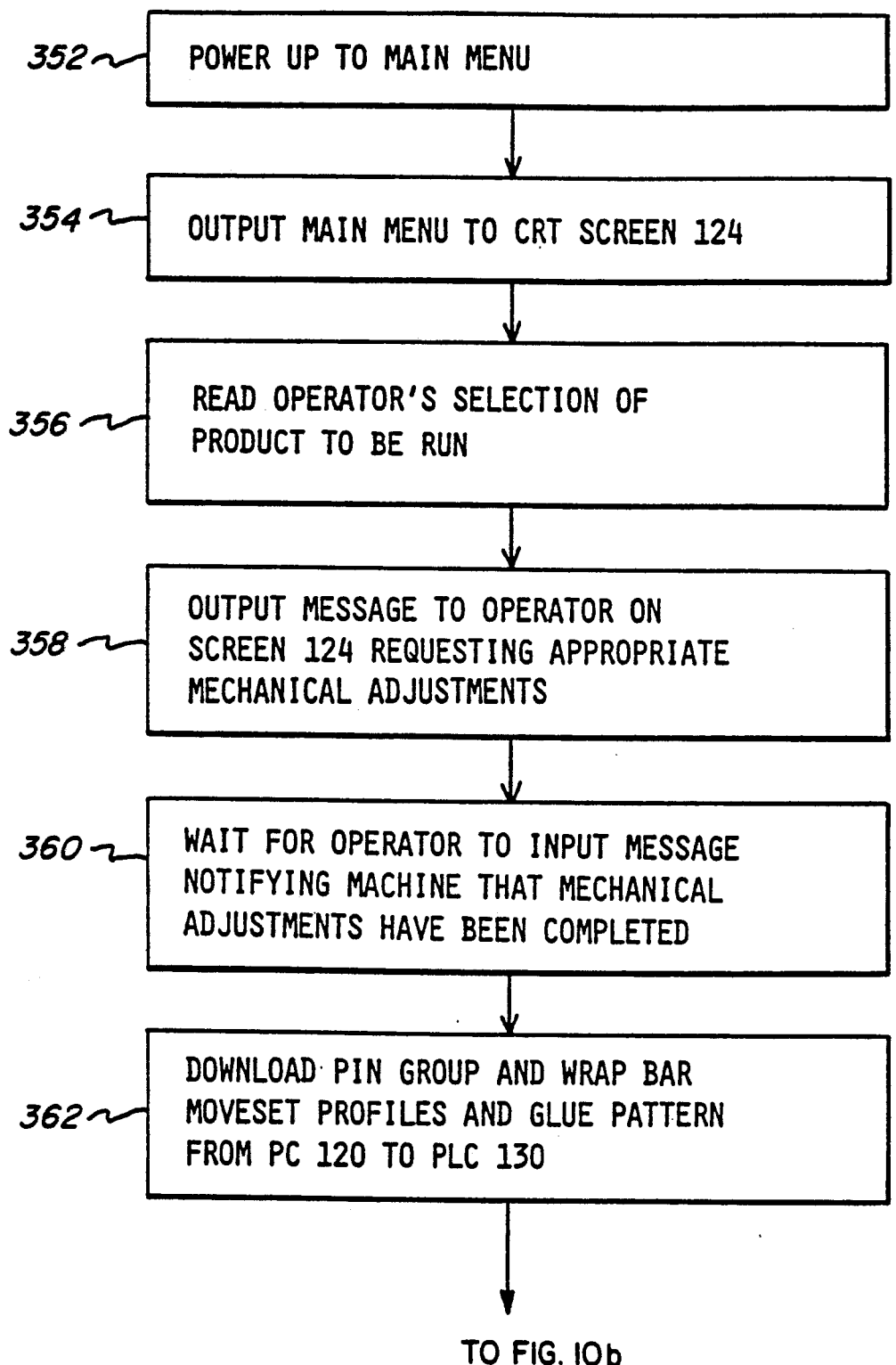
FIGS. 10a, b, c, and d are flowcharts depicting the main program for the method of the present invention and operation of the apparatus of the present invention.
Figure 10B:
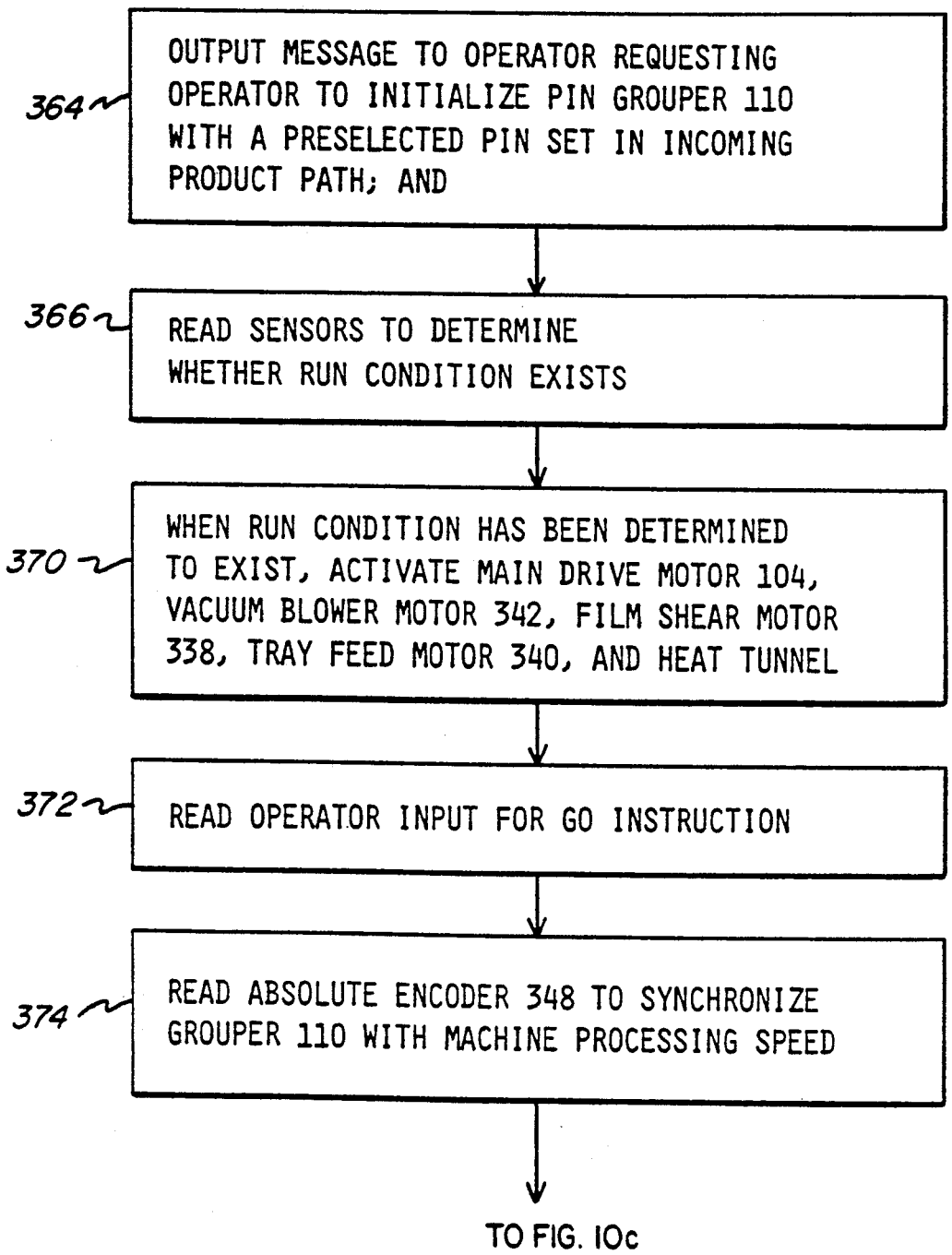
Figures 10C, 10D:
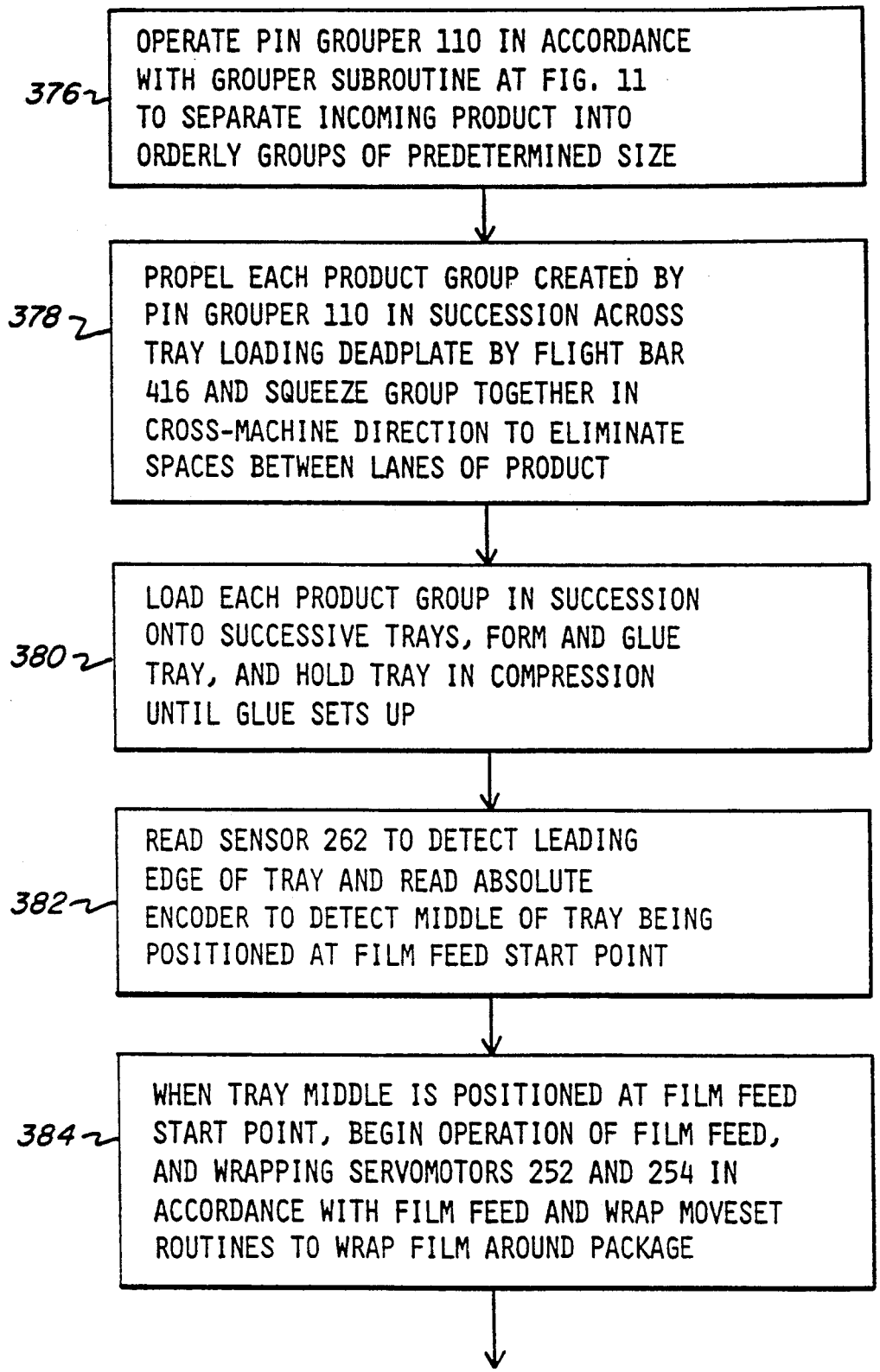
Figure 10D:
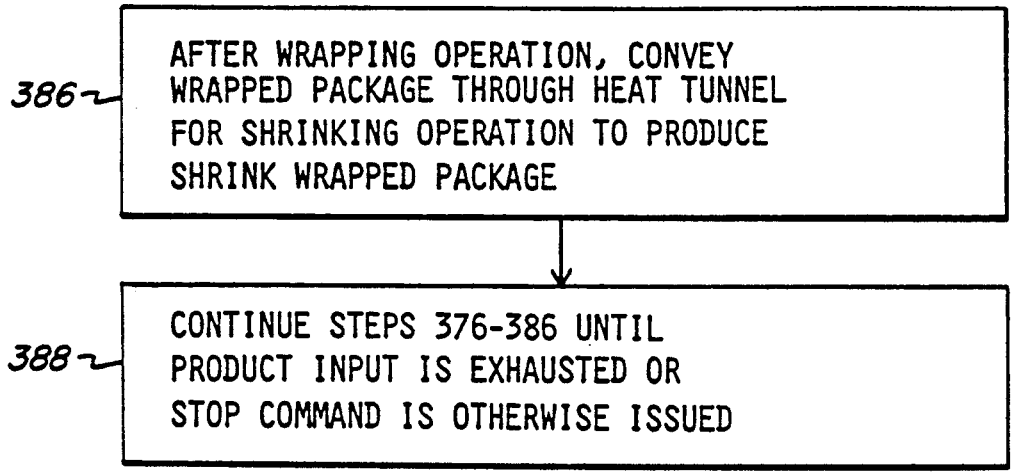

FIGS. 9a and b are a schematic block diagram of the electronic control features of the present invention. CPU 120 communicates with PLC 130 through lines 126 and 128. PLC 130 controls servocontroller #1 at 172 for servomotor 320 for grouper pins A: servocontroller #2 at 174 for servomotor 322 for grouper pins B; servocontroller #3 for servomotor 252 for film feed at 324; and servocontroller #4 at 326 for servomotor 254 for the wrapping operation through lines 314, 316, 318, and 321 respectively. Motors 320, 322, 252, and 254 of course correspond to motors of same numbers in other figures. Incremental encoders 328, 330, 332, and 334 provide routine feedback positional information to servocontrollers 172, 174, 324, and 326 respectively.

Infeed conveyor motor 336 controls the feed rate input of product at 102 and represents one source of line feed pressure as described above. Film shear drive 338 operates knife member 278 through cam wheel combination 282 and 280. Main drive motor 104 supplies rotational energy for a number of apparatus subsystems, such as for example the tray compression subsystem which is not here shown in any detail and which forms no part of the present invention. Tray feed motor 340 operates a portion of the tray feed system. Vacuum blower motor 342 operates the vacuum source for vacuum table 248. Clutches 344 provide for engagement and disengagement of a number of mechanical subsystems, the details of which form no part of the present invention. The hot melt glue system 346 is part of the tray assembly and gluing system. Absolute encoder 348 provides PLC 130 and CPU 120 with information on the positional state of the machine at any given time. The "product ready for tray" sensor 350 detects the presence of a group of articles for tray loading in section 112, which is routine and forms no part of the present invention. Photosensor 262 corresponds to the sensor of the same figure number in FIG. 6.

SYSTEM OPERATION

System operation is best explained by reference to the flowcharts in FIGS. 10, 11, and 12, which are for the most part self explanatory.

By way of additional explanation, the machine is powered up (box 352) and the main menu is output to screen 124 to inform the operator of the various operational parameters of choice and await instructions to be input on keyboard 122 such as for example the selection of product to be run (box 354). The operator's selection is then read (box 356) and the device informs the operator to make the necessary mechanical adjustments, such as for example adjusting lane guide width by turning handle 361 and changing out the necessary deadplate 224 (box 358). The operator notifies the machine through keyboard 122 that the necessary mechanical adjustments have been made (box 360). Based on the operator's choice of product to be processed, the various moveset profiles corresponding to the product to be processed are provided to PLC 130 (box 362). A typical moveset profile for the grouper is provided below by way of example only. The machine is then routinely initialized and set to run upon operator commands to do so (boxes 364 through 374). For example, the pin grouper may need to be manually initialized by positioning a particular pin set in the incoming product path (box 364). A variety of routine sensors, such as for example a sensor to determine if there is a downed article blocking the lane guides, must be read (box 366) to determine if a "run" condition exists. When the "run" condition has been determined to exist, the main drive and other components of the machine are powered up (box 370) to await operator's "run" command (box 372) and synchronize the grouper with the machine speed (box 374).

The bulk product is laned and then grouped or collated at the pin grouper. The grouper 110 generates successive discrete groups of articles from at least one row of articles being conveyed in single file along the infeed conveyor path 102 (see FIG. 2) in a direction from a more upstream towards a more downstream position as indicated by arrow 106 (see FIG. 2). It is understood that the details of the grouper actions are explained here by reference to only one row, and that the other parallel rows receive the same treatment.

Figure 11A:
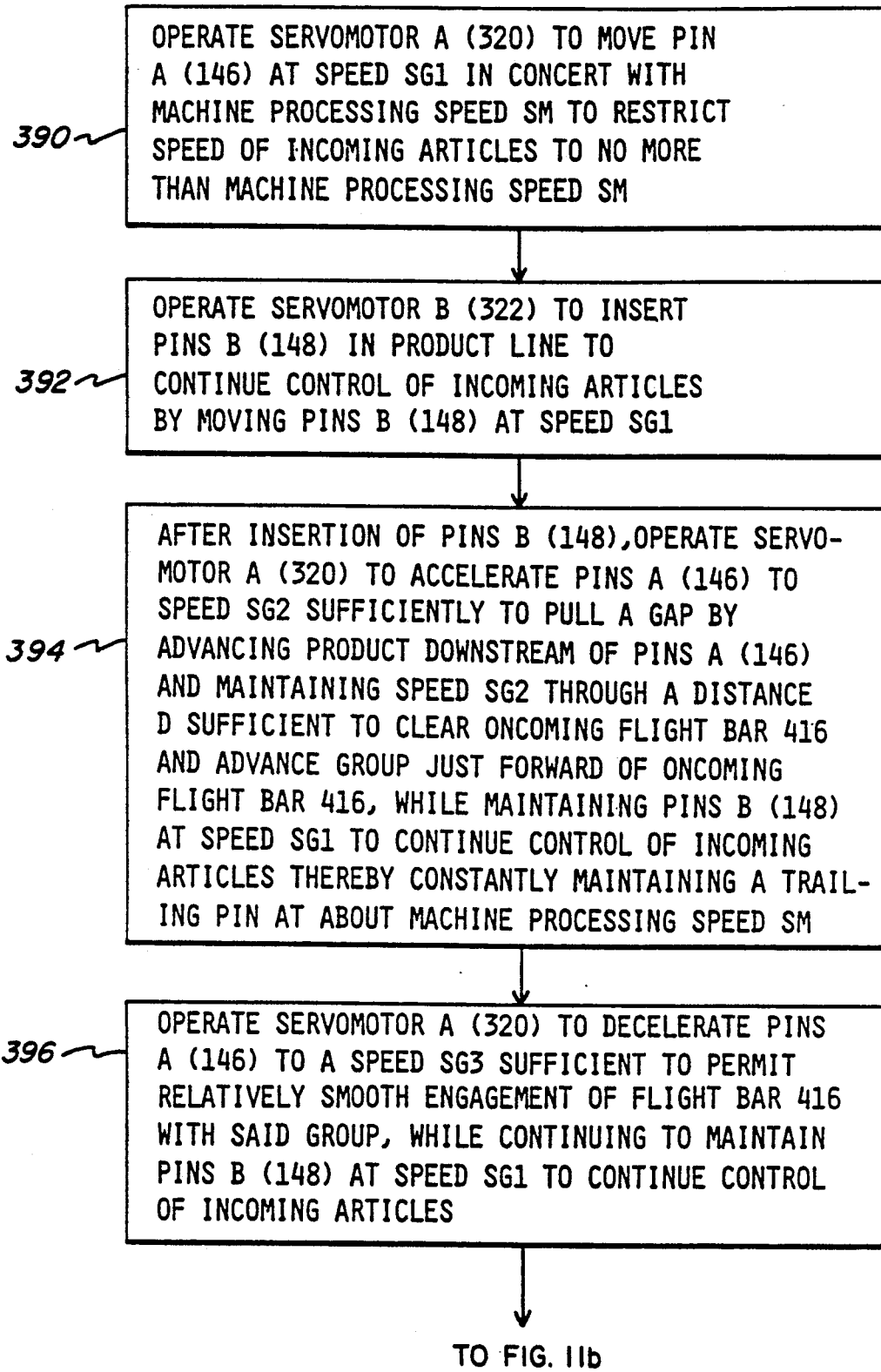
FIGS. 11a and b are flowcharts depicting the operation of the pin grouper of the present invention.
Figure 11B:
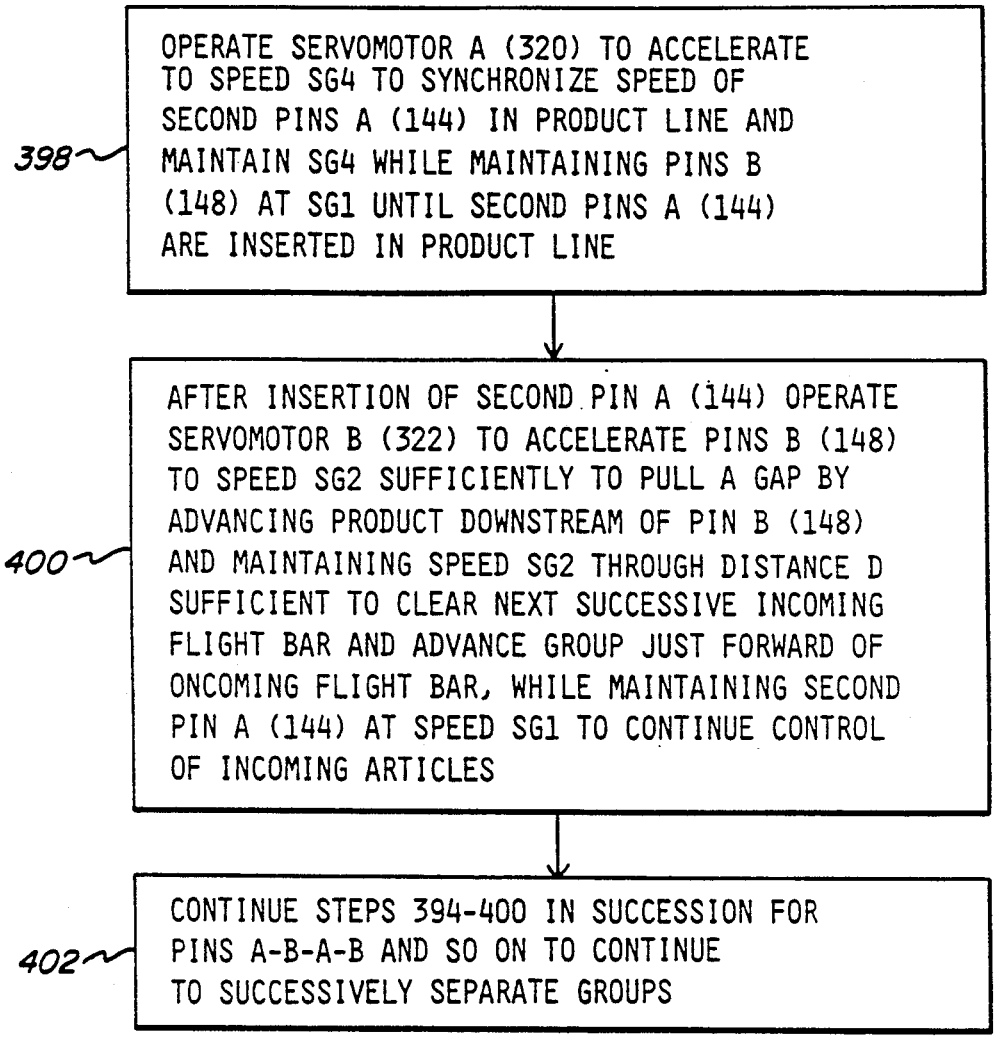
Figure 12A:
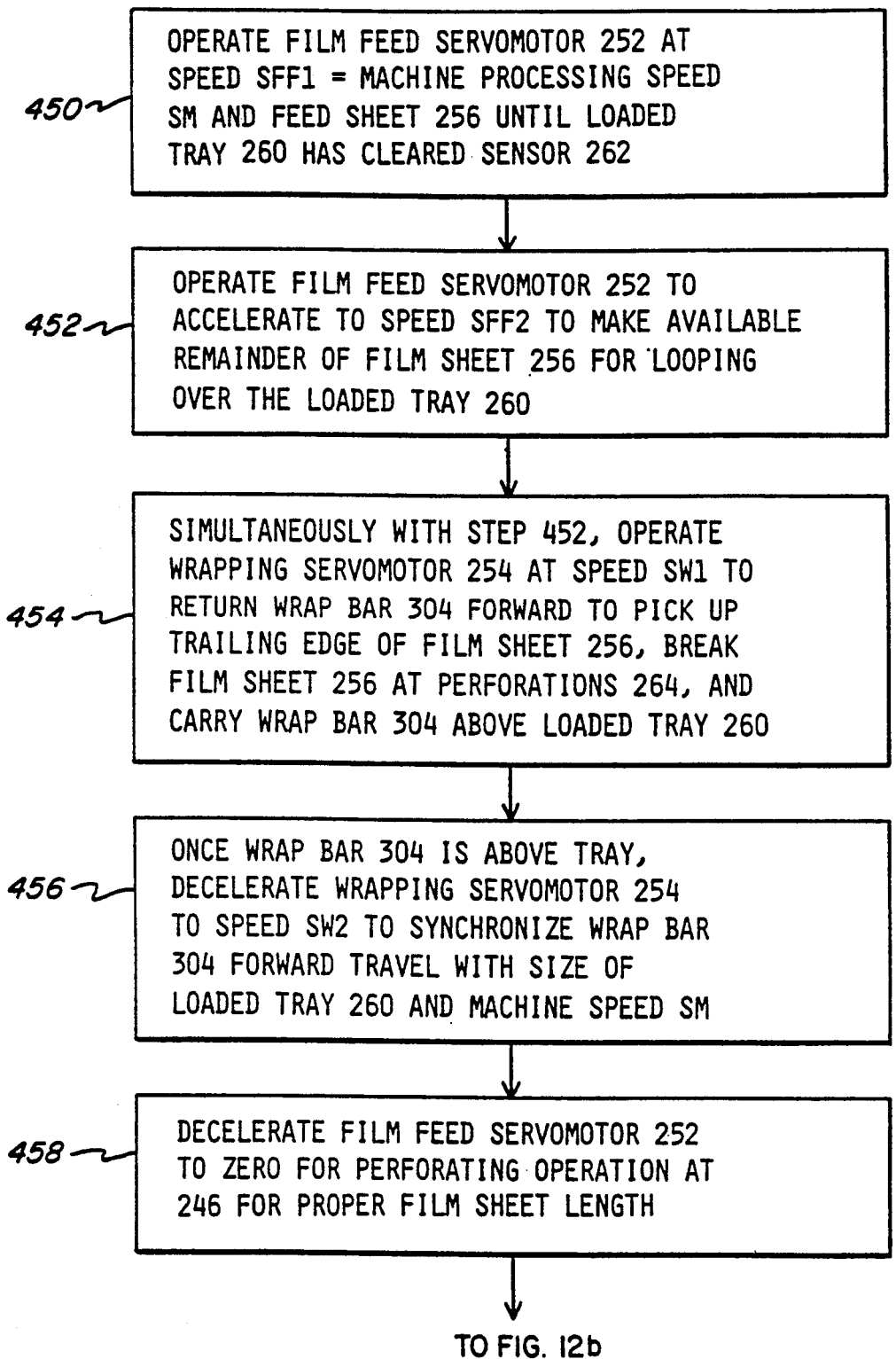
FIGS. 12a and b are flowcharts depicting the operation of the film feeding and wrapping of the present invention.
Figure 12B:
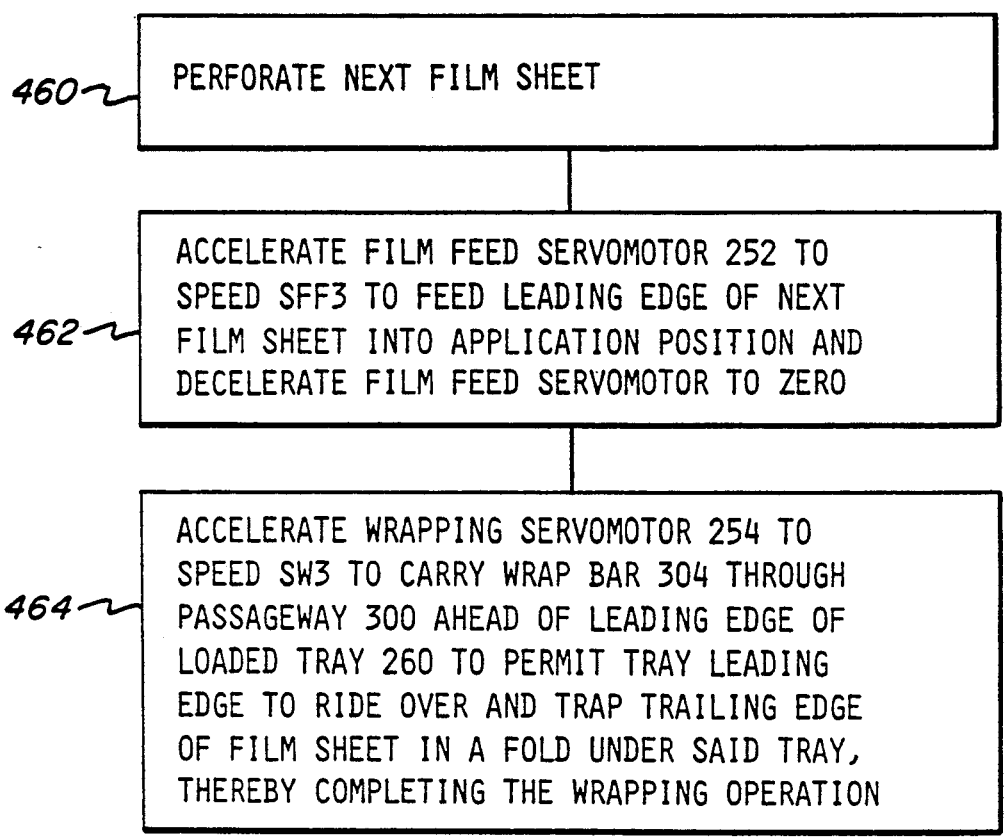

The pin grouper subroutine (box 376) is described in further detail at boxes 390-402 of FIG. 11. Also, FIG. 15 shows a curve of one portion of the grouper cycle, and the schematic diagrams of FIGS. 13a–i in conjunction with a typical table of pin grouper movesets provide a more specific example of grouper operation.

Figure 15:
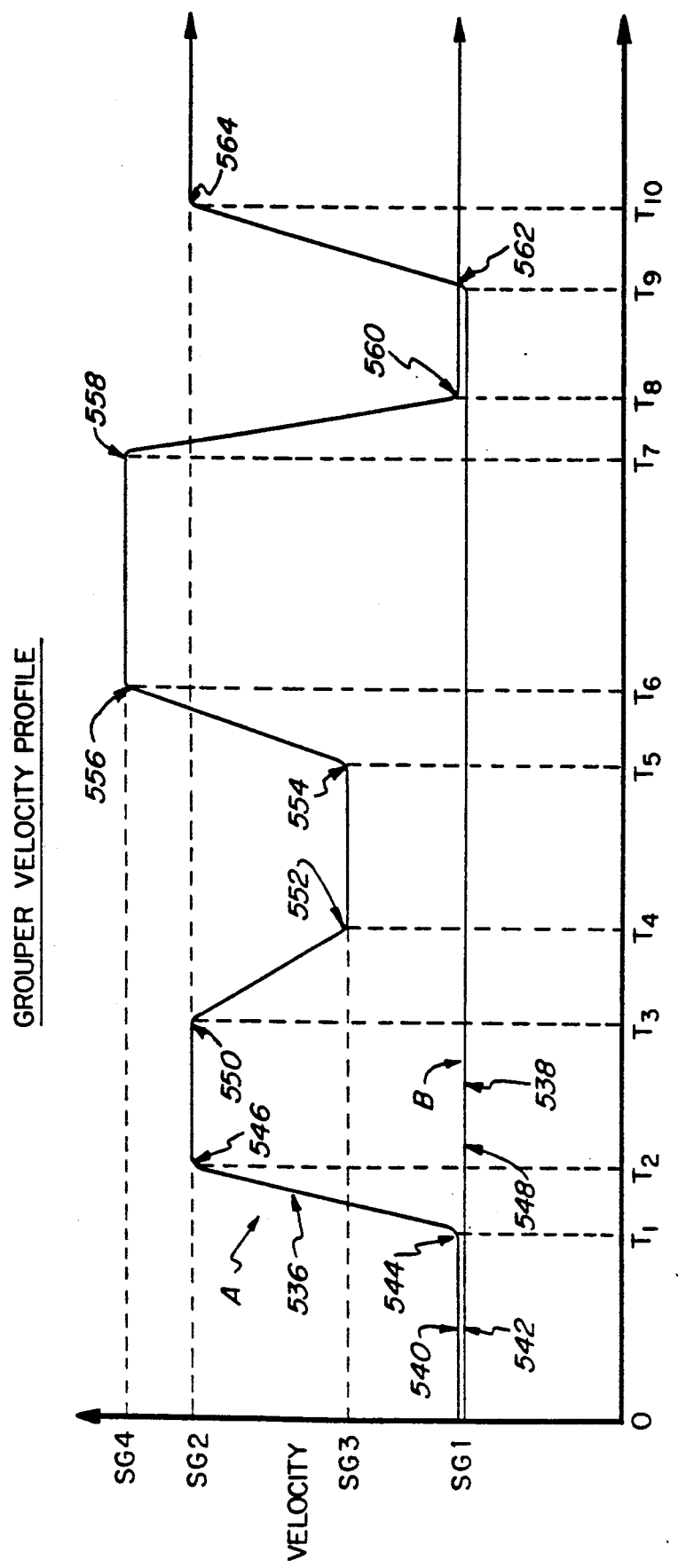
FIG. 15 is a graph of the grouper velocity profile for a portion of a grouper cycle.

The relationship between the pins A and B of the grouper is first explained with respect to FIG. 15, which is a generic curve of one portion of the grouper cycle. Grouper servomotor A (320) is operated generally as indicated by curve 536, whereas grouper servomotor B (322) is operated generally as indicated by curve 538.

After initializing and reaching steady state of operation, the grouper servomotor A (320) is operated at speed grouper SG1 as indicated at 540, which is approximately the same as machine speed SM, thereby restricting the speed of incoming articles to no more than SM (box 390).

Also, at some point prior to time $t=T_1$, grouping servomotor B (322) is operated to insert pins B (148) in the product line upstream of pins A (146) and move pins B also at speed SG1 as indicated generally at 542 (box 392). Therefore, before time $t=T_1$, both pins A and B are inserted in the product line and are moving at speed SG1. It is understood that, although the curves for A and B are shown separated slightly in FIG. 15 for $0<t<T_1$ and again at $T_8<t<T_9$, this is for purposes of illustration only and the speeds in such intervals are preferably identical.

At time $t=T_1$ at 544, grouper servomotor A (320) is accelerated from speed SG1 to achieve speed SG2 at time $t=T_2$ at 546 sufficiently to pull a gap between the group of articles just downstream of pins A and the remaining row of products upstream by accelerating the group over deadplate 224, while grouper servomotor B (322) is maintained at SG1 as shown at 548 to maintain product infeed of the remaining products to approximately SM. Grouper servomotor A (320) maintains speed SG2 until time $t=T_3$ at 550 to thereby gradually pull a gap of desired width. It is understood that a distance D travelled between time $t=T_2$ and time $t=T_3$ is simply SG2 multiplied by $(T_3-T_2)$. The time interval $T_3-T_2$ is long enough to clear the oncoming flight bar 416 (box 394). Flight bar 416 is simply a routine way of collecting the groups and sweeping them on to the tray loading section.

Grouper servomotor A (320) is decelerated beginning at time $t=T_3$ at 550 down to speed SG3 at time $t=T_4$ at 552 sufficient to permit proper engagement of the product group with flight bar 416. Grouping servomotor B (322) is still maintained at speed SG1 to continue control of product infeed (box 396).

After blending the group with the flight bar 416, at time $t=T_5$ at 554, grouping servomotor A (320) is accelerated to speed SG4 at time $t=T_6$ at 556 to advance pins A (146) back towards their reinsertion point and also to synchronize the speed of the next set of A pins (144) on the servomotor A chain for insertion into the product line as the next pins A. Grouping servomotor B (322) is still maintained at speed SM until second pins A (144) are inserted, which takes place approximately at time $t=T_7$ at 558, where grouping servomotor A (320) is decelerated down to reach SG1 again at time $t=T_8$ at 560 (box 398).

After insertion of the next or second set of pins A (144), grouping servomotor B (322) is accelerated at time $t=T_9$ at 562 from SG1 to reach SG2 at time $t=T_{10}$ at 564, at which point grouping servomotor B (322) and its associated pins B (148) follow the same velocity profile as pins A (146) (box 400), with pins B pulling a gap while pins A restrain product flow. This cycle is continued, with pins A next pulling a gap while pins B again restrain flow. This cycle continues to successively separate groups as specified at box 402.

By way of further example and explanation only, a portion of a particular set of grouper movesets are herein presented in the Table set forth below, which is to be read in conjunction with the schematic of FIG. 13. This Table of pin movesets is reproduced from a computer printout of only one typical set of movesets stored in memory. It is understood that this data set is by way of example only and is not intended to be limiting of the present invention. The "STEP" column identifies program steps, each step representing a uniform or normalized increment of time; the "Speed of Pins A" column sets forth the A pin speed $S_A$ in a clockwise direction as shown at 146 in FIGS. 13a–i in per unit values of machine processing speed SM; the "Speed of Pins B" column sets forth the B pin speed $S_B$ in a clockwise direction at 148 in FIGS. 13a–i in the same per unit values; the "Distance From Pin A To Pin B" column describes the pin pitch or lateral distance 408 indicated in FIG. 13a; and the "Distance From Pin B To Pin A" column describes the distance 410 around the chain loop 412 in the other direction. The "clockwise" direction is "downstream" for the top run of the pins on chains 152 and 162. Loop 412 represents the pin path traveled by the pin along chains (Pins A) and 162 (Pins B). Rectangles 414 represent an incoming row of articles to be grouped. Figure number 416 indicates a flight bar that follows flight bar path 418 to further sweep groups of articles such as at 420 further downstream after being grouped.

| | Table of Pin Movesets | | | |
|---|---|---|---|---|
| STEP | Speed of Pins A | Speed of Pins B | Pin Distance From Pin A to Pin B | Pitch Distance From Pin B to Pin A |
| 8 | 1.00 | 1.00 | 10.5 | 22.5 |
| 9 | 1.50 | 1.00 | 10.719 | 22.281 |
| 10 | 2.00 | 1.00 | 11.156 | 21.844 |

-continued

Table of Pin Movesets

| STEP | Speed of Pins A | Speed of Pins B | Pin Distance From Pin A to Pin B | Pitch Distance From Pin B to Pin A |
|---|---|---|---|---|
| 11 | 2.50 | 1.00 | 11.813 | 21.188 |
| 12 | 3.00 | 1.00 | 12.688 | 20.313 |
| 13 | 3.00 | 1.00 | 13.563 | 19.438 |
| 14 | 2.50 | 1.00 | 14.220 | 18.780 |
| 15 | 2.00 | 1.00 | 14.875 | 18.125 |
| 16 | 1.50 | 1.00 | 15.094 | 17.906 |
| 17 | 1.50 | 1.00 | 15.313 | 17.688 |
| 18 | 1.50 | 1.00 | 15.531 | 17.469 |
| 19 | 1.50 | 1.00 | 15.750 | 17.250 |
| 20 | 1.50 | 1.00 | 15.969 | 17.031 |
| 21 | 1.50 | 1.00 | 16.188 | 16.813 |
| 22 | 1.50 | 1.00 | 16.406 | 16.594 |
| 23 | 1.50 | 1.00 | 16.625 | 16.375 |
| 24 | 1.50 | 1.00 | 16.844 | 16.156 |
| 25 | 2.00 | 1.00 | 17.281 | 15.719 |
| 26 | 3.00 | 1.00 | 18.156 | 14.844 |
| 27 | 3.00 | 1.00 | 19.031 | 13.969 |
| 28 | 3.00 | 1.00 | 19.906 | 13.094 |
| 29 | 3.00 | 1.00 | 20.781 | 12.219 |
| 30 | 3.00 | 1.00 | 21.656 | 11.344 |
| 31 | 2.93 | 1.00 | 22.500 | 10.500 |
| 32 | 1.00 | 1.00 | 10.500 | 22.500 |

Flowchart boxes 390 and 392 correspond generally to Step #8; box 394 corresponds generally to Steps #9-#13; box 396 corresponds generally to Steps #14-#24; and box 398 corresponds generally to Steps #25-#30.

Figure 13A:
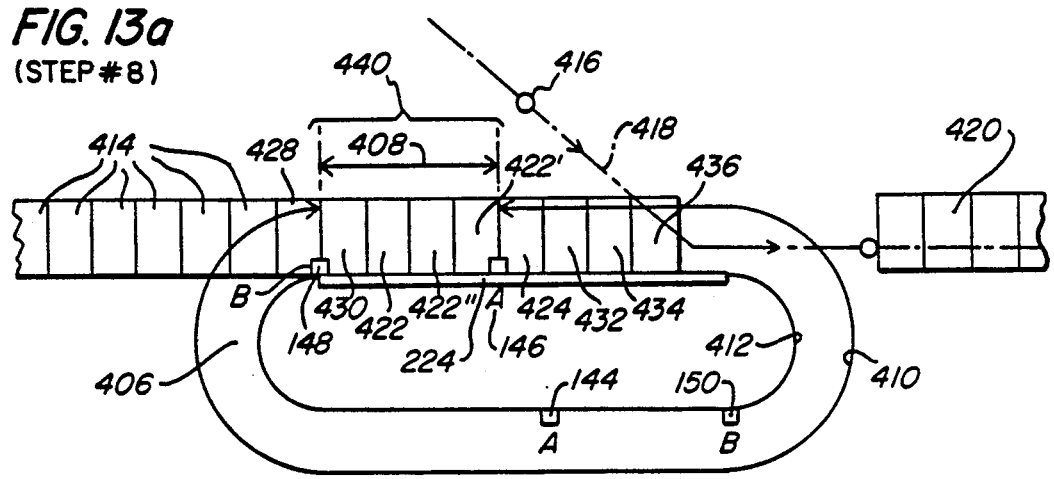
FIGS. 13a, b, c, d, e, f, g, h, and i are schematic representations of the operation of the pin grouper of the present invention.

In the Table of Pin Movesets, the first 7 Steps have been eliminated as unnecessary to the present explanation, as the first 7 Steps can be taken as merely part of the initialization for the grouper. The four articles indicated at 422, 422', 422", and 430 comprise a group 440 and have been pushed onto stationary deadplate 224 by upstream line feed pressure transmitted through abutting articles such as articles 414, 428, and 430, with article 422' being the first article in a leading portion of the row. Articles 424, 432, 434, and 436, which were formerly the leading portion, are shown in FIG. 13a as already being downstream of pin A (146) for grouping.

Pins A and B have been inserted to project into the leading portion of articles by moving said pins around their respective chains to be inserted between adjacent ones of said articles. Beginning at Step 8, $S_A = 1.00 =$ SG1 and $S_B = 1.00 =$ SG1 as shown in FIG. 13a This corresponds approximately to the beginning position of the pins as shown in FIG. 3. Pin A at 146 is the leading pin inserted between adjacent articles 422' and 424, while Pin B at 148 is a trailing pin inserted at a more upstream point between adjacent articles 428 and 430. Both Pin A (146) and Pin B (148) at Step #8 are moving downstream at a velocity approximately equal to machine speed SM. Because of the deadplate 224, articles 424, 432, 434, and 436 downstream of Pin A (146) are pushed along only by Pin A (146) and are not accelerated any faster as articles would be by means such as a moving conveyor belt that might be used in the prior art instead of the deadplate 224 (see generally boxes 390-392).

Figure 13B:
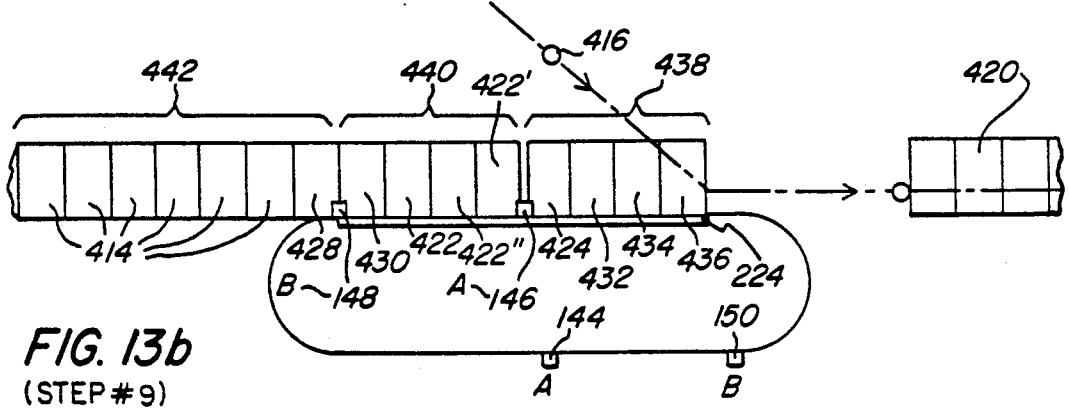

In FIG. 13b corresponding generally to Step #9, Pin A (146) begins to be accelerated relative to Pin B (148) to begin to accelerate articles 424, 432, 434, and 436 making up group 438 further downstream. However, while $S_A = 1.50$, Pin B (148) remains at $S_B = 1.00 =$ SG1. Because of the deadplate, the next article group 440 is pushed along solely by Pin B (148), while articles 442 upstream of Pin B which comprise a next leading portion of the incoming laned articles to be grouped after group 440 follow Pin B and are pushed onto the deadplate by normal line feed pressure. Pin B limits the speed on said oncoming articles to $S_B = 1.00 =$ SG1, which is approximately machine speed.

Figure 13C:
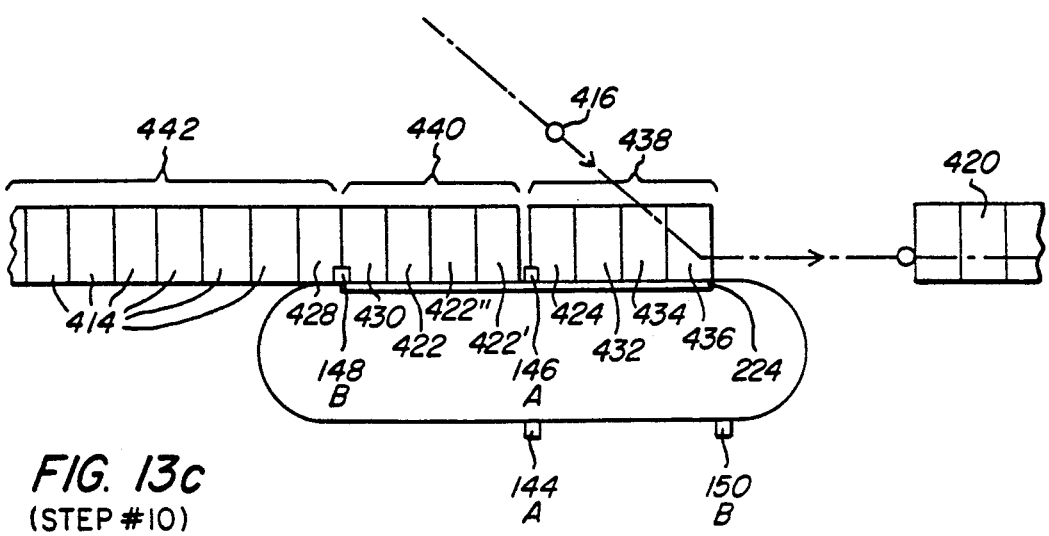
Figure 13D:
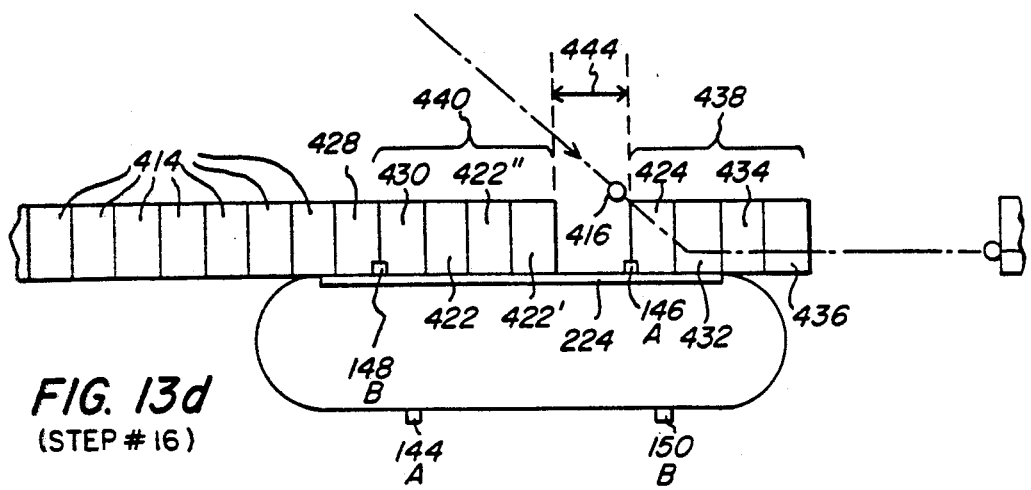
Figure 13E:
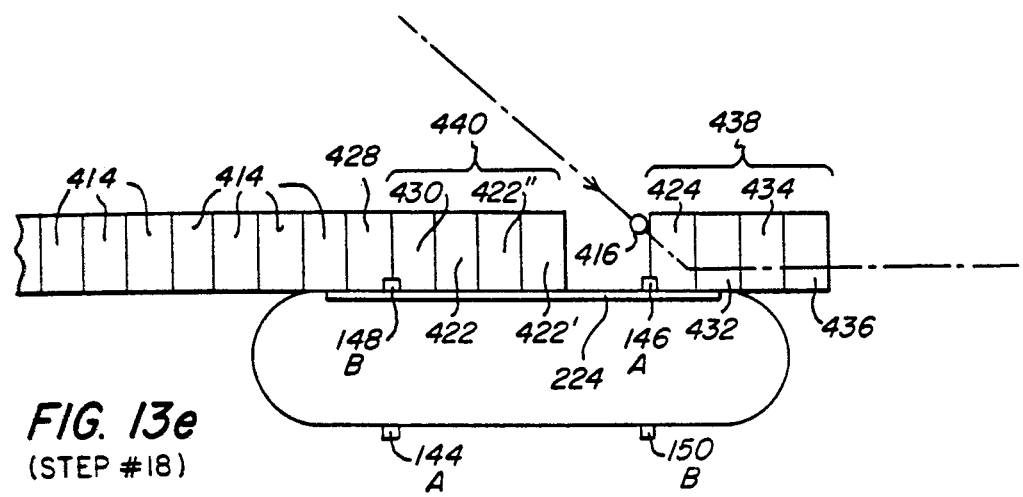
Figure 13F:
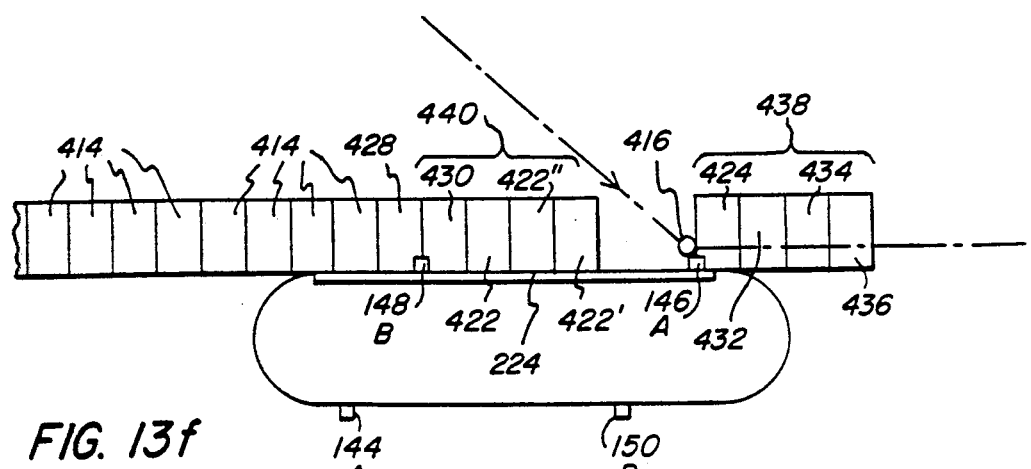
Figure 13G:
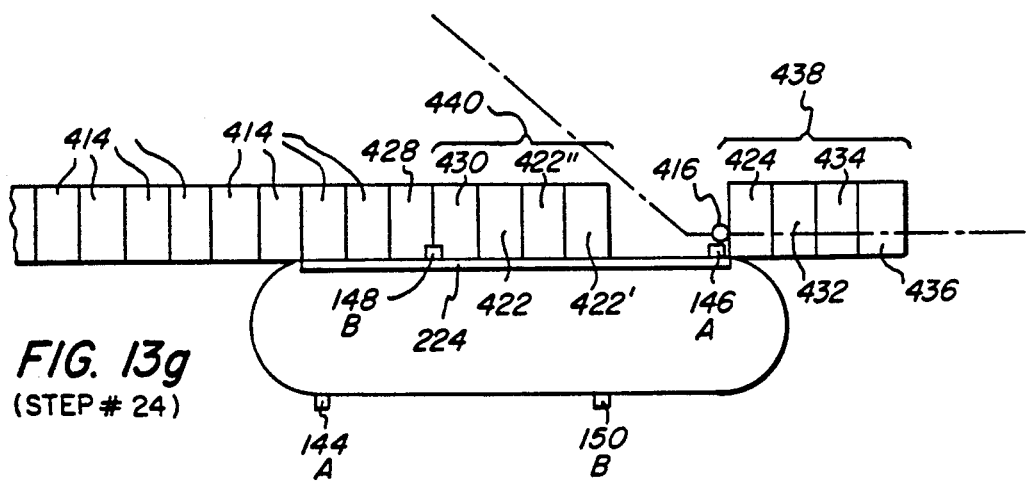

As Pin A (146) continues to accelerate at FIGS. 13b and 13c all the way up to $S_A = 3.00 =$ SG2 at Steps #12 and 13, a gap 444 is pulled between group 438 and the remaining articles in the leading portion of the row.

At FIGS. 13d-g, the leading Pin A (146) decelerates to $S_A = 1.50 =$ SG3 (box 396) to permit a smooth merging of flight bar 416 with group 438; otherwise, bar 416 may slam into group 438 and knock some of the articles out of alignment.

Figure 13H:
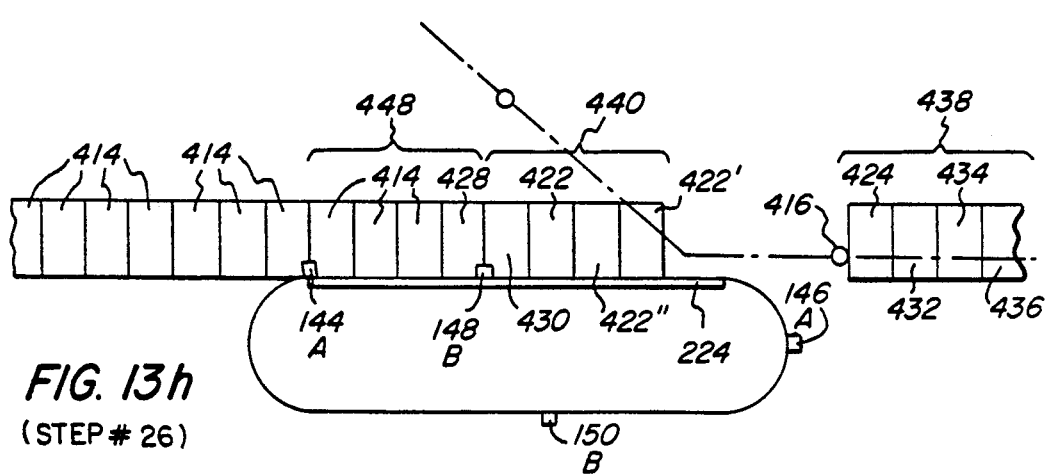
Figure 13I:
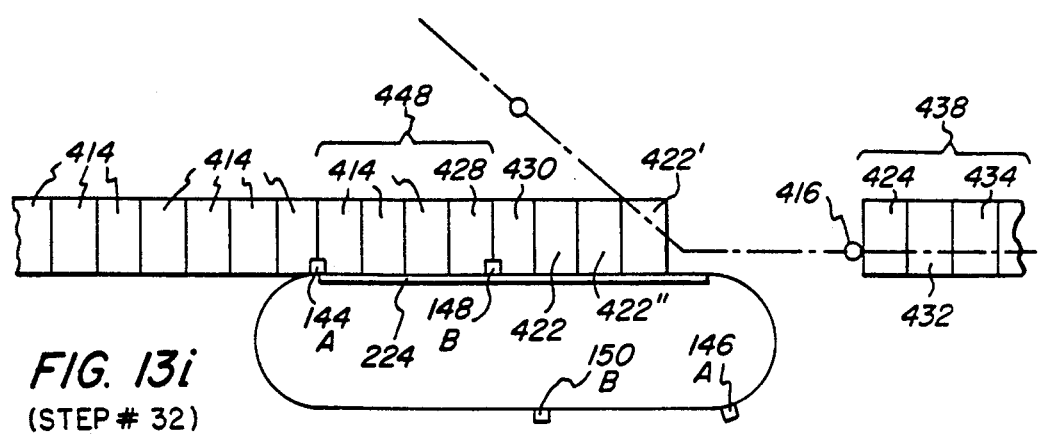

At FIGS. 13h and 13i the pins A are accelerated to $S_A = 3.00 =$ SG4 so that next pin A on chain A at 144 is inserted into the row and pins A are decelerated back to $S_A = 1.00 =$ SG1 again to create yet another successive group of articles at 448.

The cycle continues in succession with pin B (148) now being accelerated, then second pin A (144), then second pin B (150) is inserted and accelerated, then first pin A again (146) is inserted and accelerated, and so on as the pins are inserted in succession and then accelerated in the same succession to sweep successive groups of articles over the deadplate and into the flight bar path.

After being grouped, by reference to FIG. 10c again the grouped articles are loaded into trays and the trays are assembled (boxes 378-380).

Figure 14:
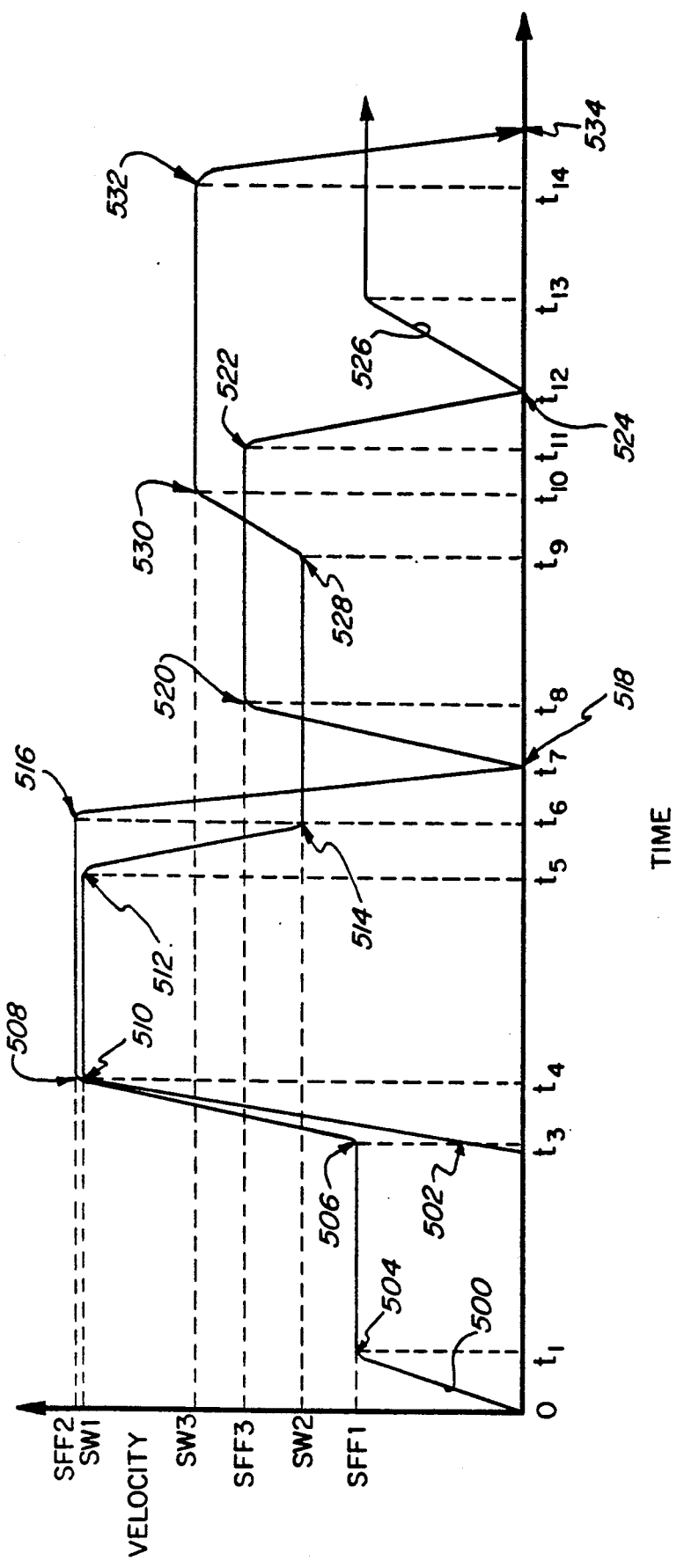
FIG. 14 is a graph of the film feed and wrap bar velocity profile for a portion of a cycle.

Then, as described in boxes 382 and 384, the film sheet is fed up and wrapped around the tray loaded articles. The film feeding and wrapping subroutine is further described in boxes 450, 452, 454, 456, 458, 460, 462, and 464 of FIG. 12. FIG. 14 provides a curve 500 of the velocity profile of the film feed servomotor 252 versus time and also a curve 502 of the velocity profile of the wrap bar servomotor 254 versus time to further demonstrate how the film feeding and wrapping operations are coordinated. The time scale of FIG. 14 is not to be confused with the time scale of FIG. 15; that is, time $t = t_1$ for FIG. 14 and time $t = T_1$ for FIG. 15 are not meant to correspond. FIGS. 16a-g provide a schematic of the film feed and wrapper operation.

When a loaded tray 260 of grouped products proceeds along the conveyor path towards the wrapping section 114, sensor 262 detects the leading edge of tray 260 and film feed servomotor 252 is activated to accelerate from zero to reach speed film feed SFF1 at time $t = t_1$ as shown at 504 in FIG. 14. SFF1 is approximately equal to the machine processing speed SM, such that the leading edge 258 of film sheet 256 is fed underneath the middle of the bottom of loaded tray 260. SFF1 is maintained from time $t = t_1$ to time $t = t_3$ at 506, when loaded tray 260 has cleared sensor 262 (box 450). This is depicted schematically in FIGS. 16a-c.

Figure 16A:
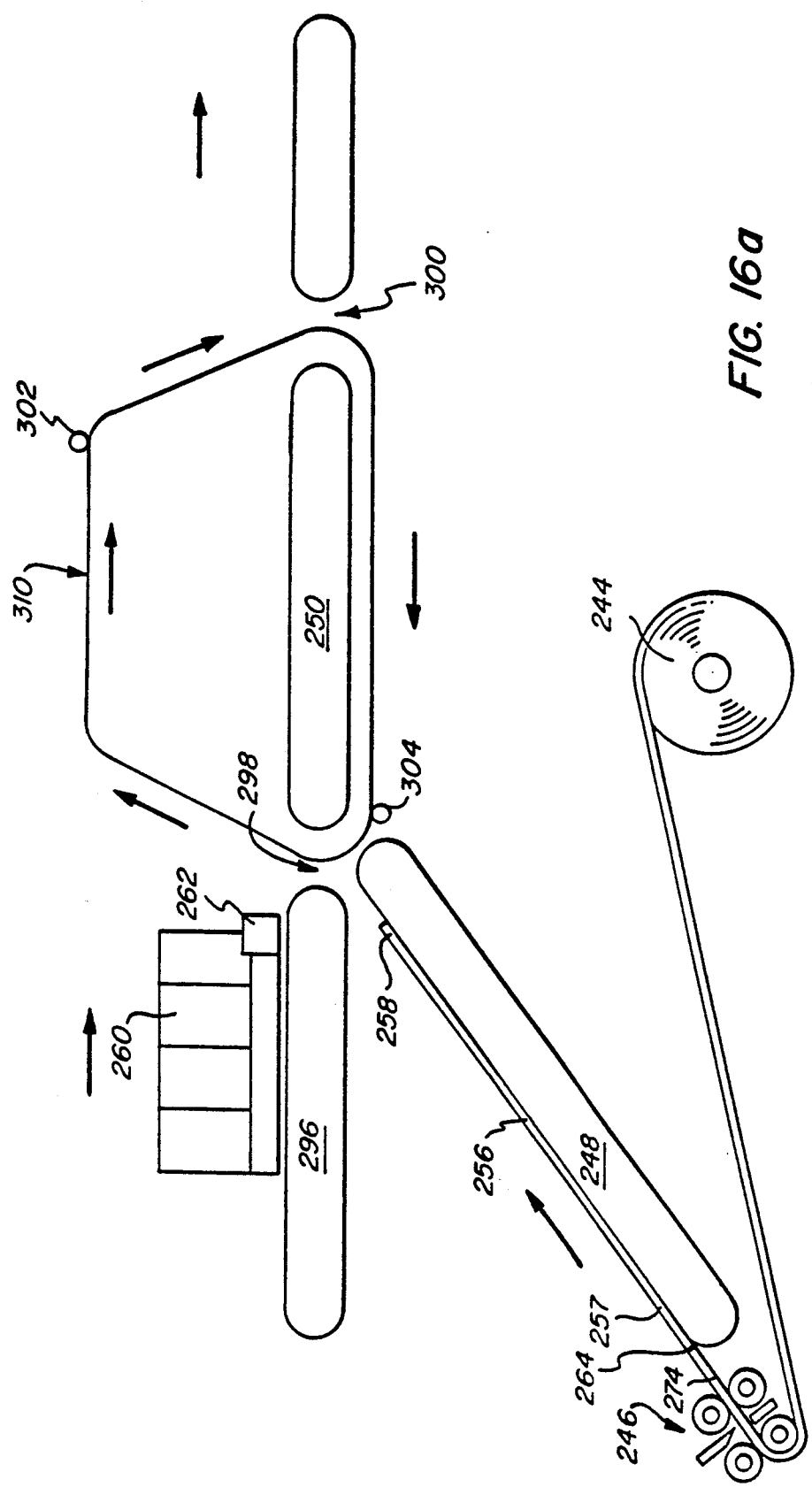
FIGS. 16a, b, c, d, e, f, and g are schematic representations of the operation of the film feed and wrapping devices of the present invention.
Figure 16B:
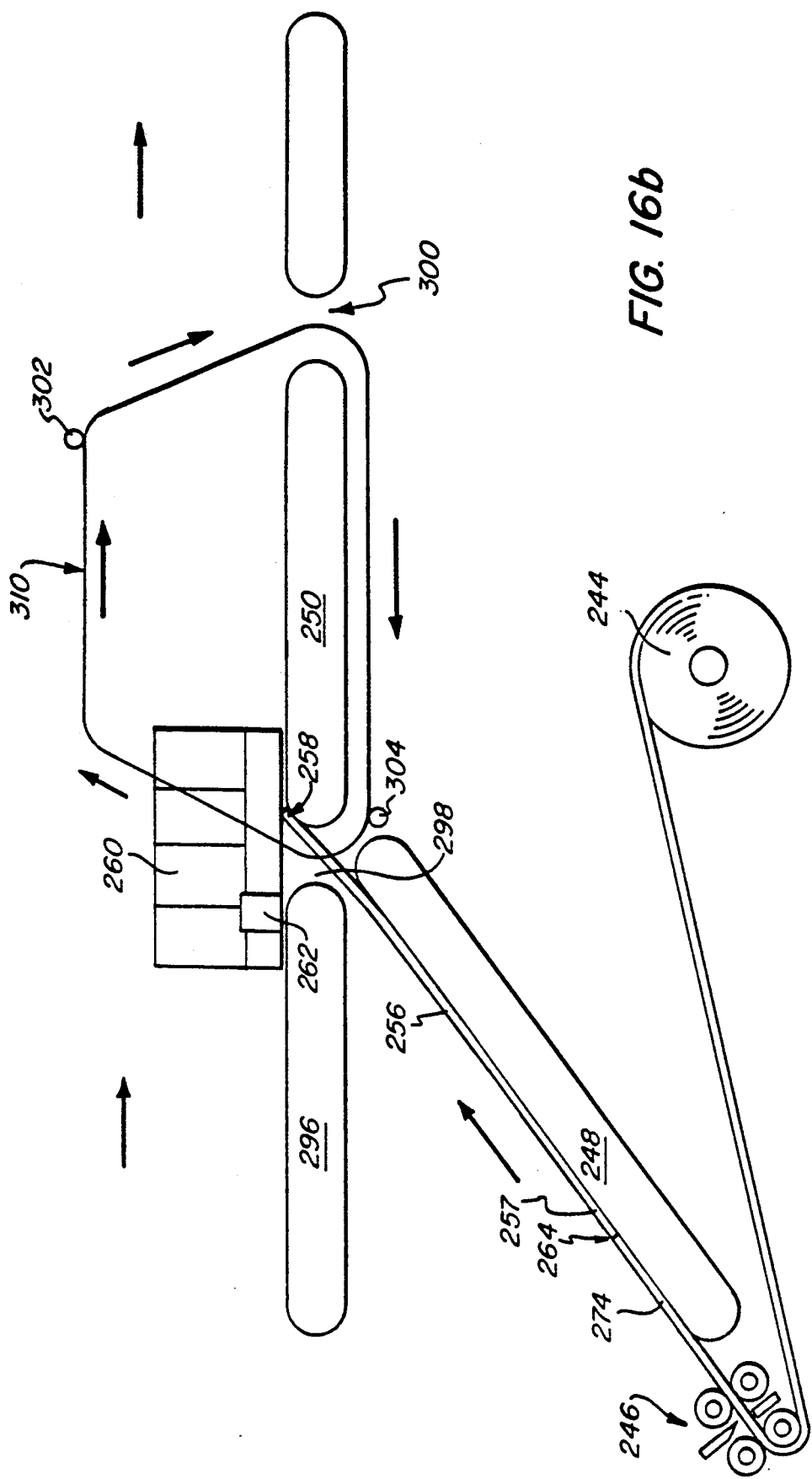
Figure 16C:
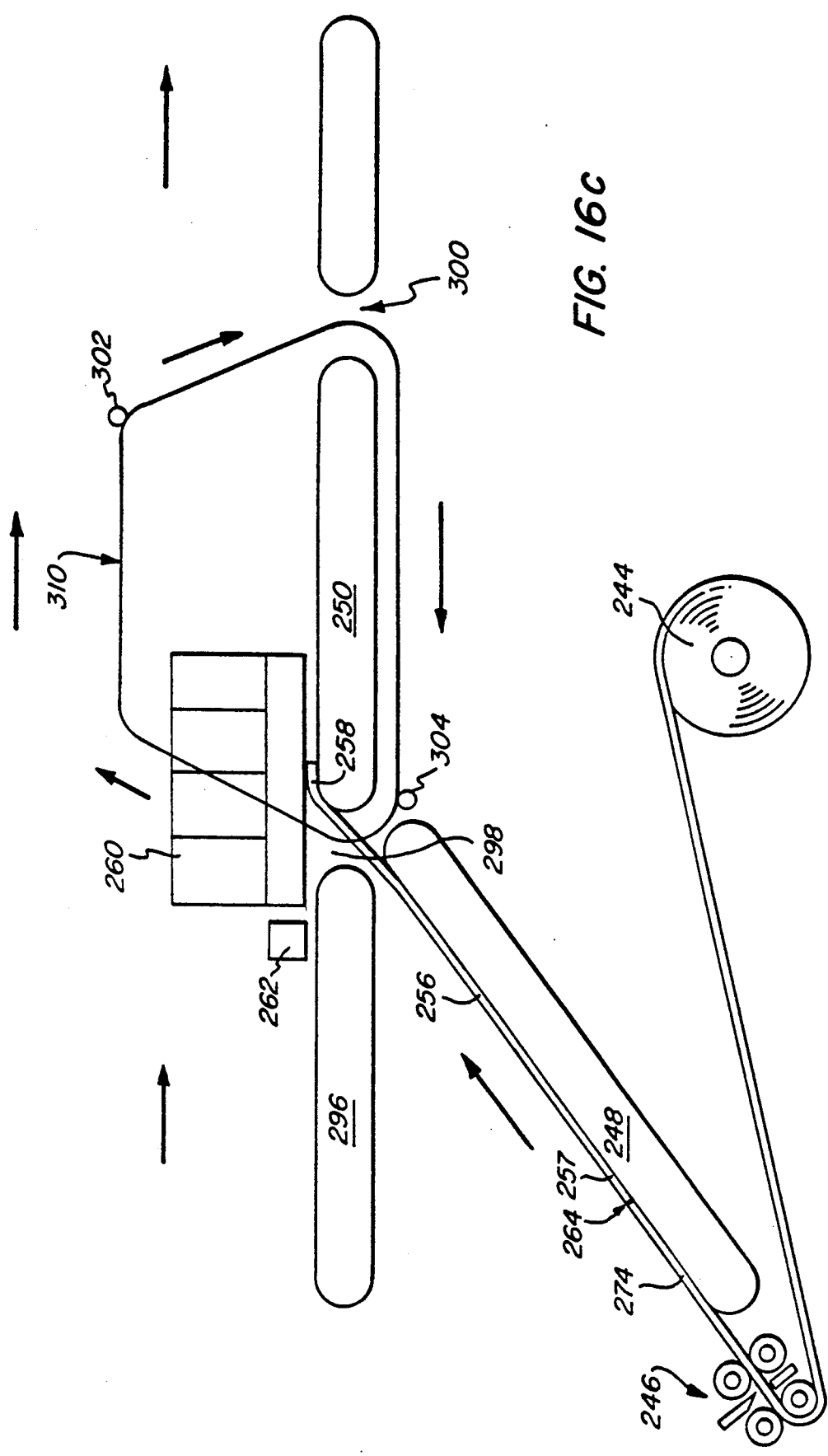
Figure 16D:
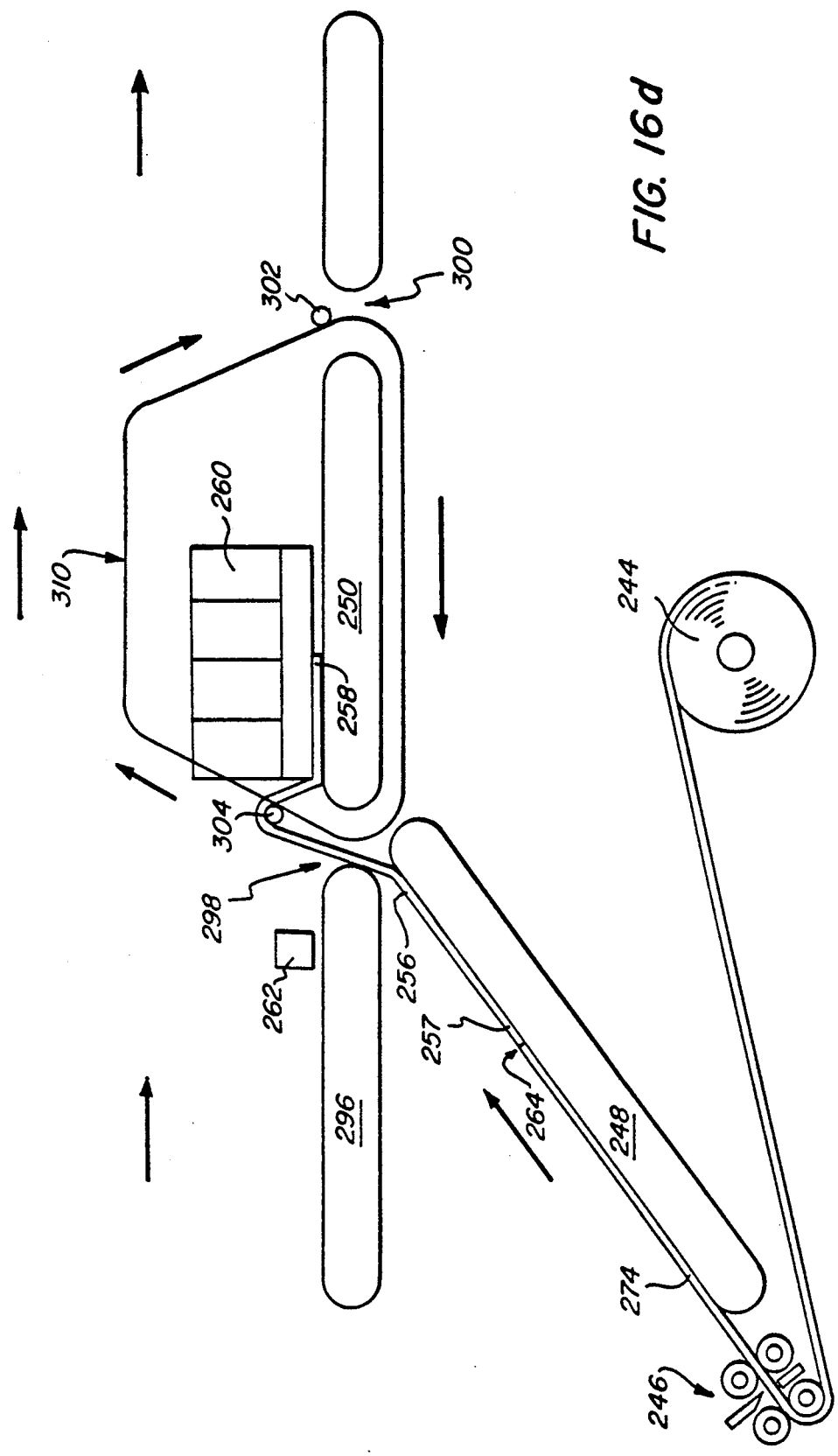
Figure 16E:
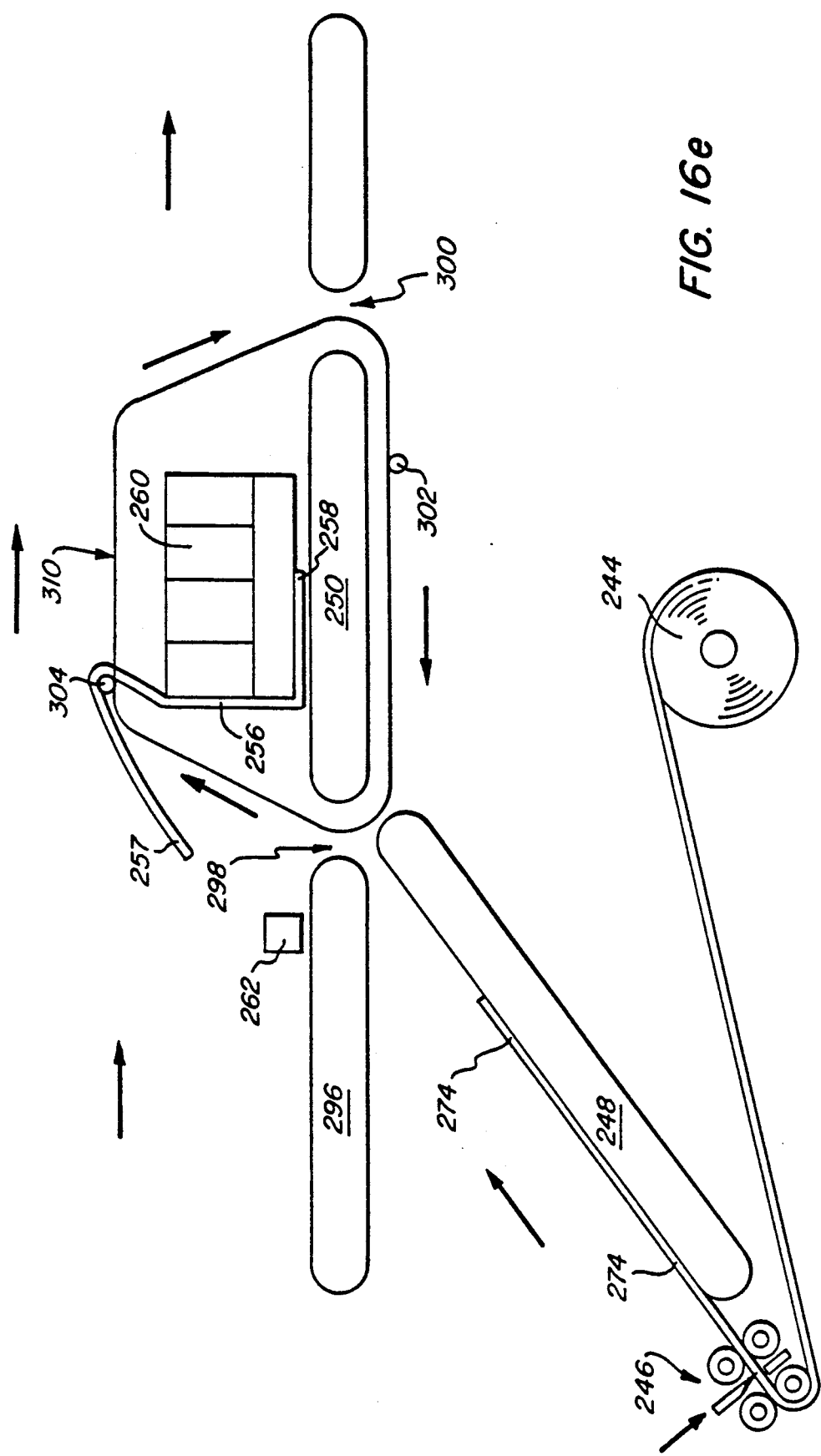

At time $t = t_3$, film feed servomotor 252 is accelerated from SFF1 to SFF2 at 508 at time $t = t_4$. This is for the purpose of making available the remainder of the film sheet 256 to the wrap bar mechanism for looping over and around the loaded tray 260 (box 452). Also, beginning at time $t = t_3$, the wrapping servomotor 254 is accelerated from zero to speed SW1 at 510 at time $t = t_4$ to move wrap bar 304 forward to pick up trailing edge 257 of film sheet 256. This is depicted at FIG. 16d. The film sheet 256 is broken away from the remaining roll at perforations 264, wrap bar 304 with the sheet carried thereon is moved above tray 260 (box 454). This is depicted at FIG. 16e.

Wrapping servomotor speed SW1 is maintained from time t=t4 to time t=t5 for a sufficient time to get the wrap bar 304 above the loaded tray 260. At time t=t5, wrapping servomotor 254 is decelerated as shown at 512 down to speed SW2 at time t=t6 as indicated at 514 to synchronize wrap bar 304 forward travel with the size of loaded tray 260 and machine speed SM (box 456).

Also at about time t=t6, film feed servomotor 252 is decelerated from speed SFF2 at 516 down to zero at time t=t7 as indicated at 518, thereby temporarily stopping the movement of the film sheet for the perforating operation to take place at mechanism 246 (box 458). The next film sheet is perforated (box 460). This is also shown in FIG. 16e.

Figure 16F:
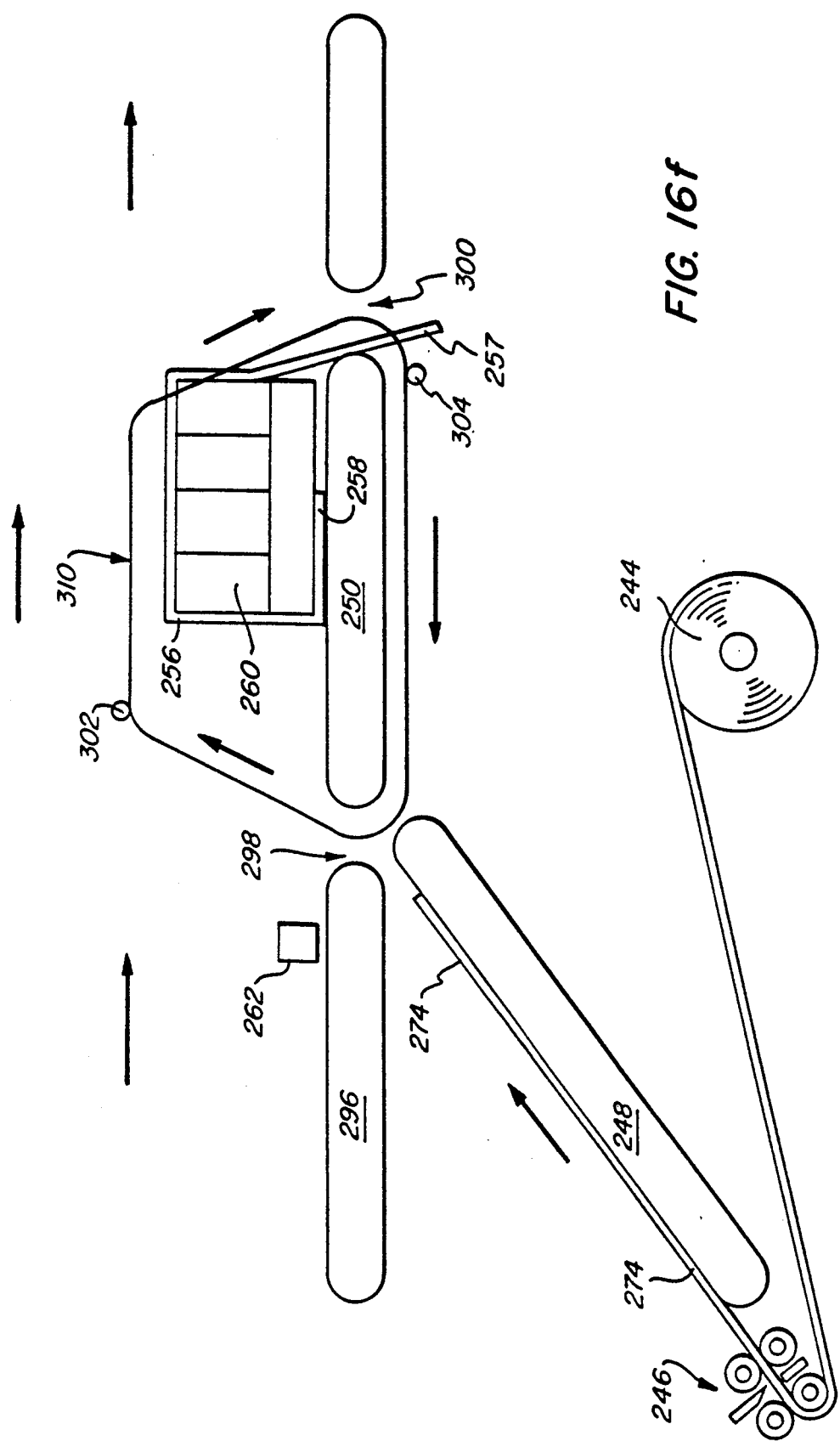

After perforation, film feed servomotor 252 is accelerated from zero at time t=t7 to achieve speed SFF3 at time t=t8 as indicated at 520 to feed leading edge 274 of the next film sheet into application position (FIG. 16f). At time t=t11, film feed servomotor 252 is decelerated from SFF3 at 522 down to zero at 524 and time t=t12 to await the next loaded tray being sensed by sensor 262, at which time the cycle begins all over again as indicated by curve portion 526 (box 462).

Figure 16G:
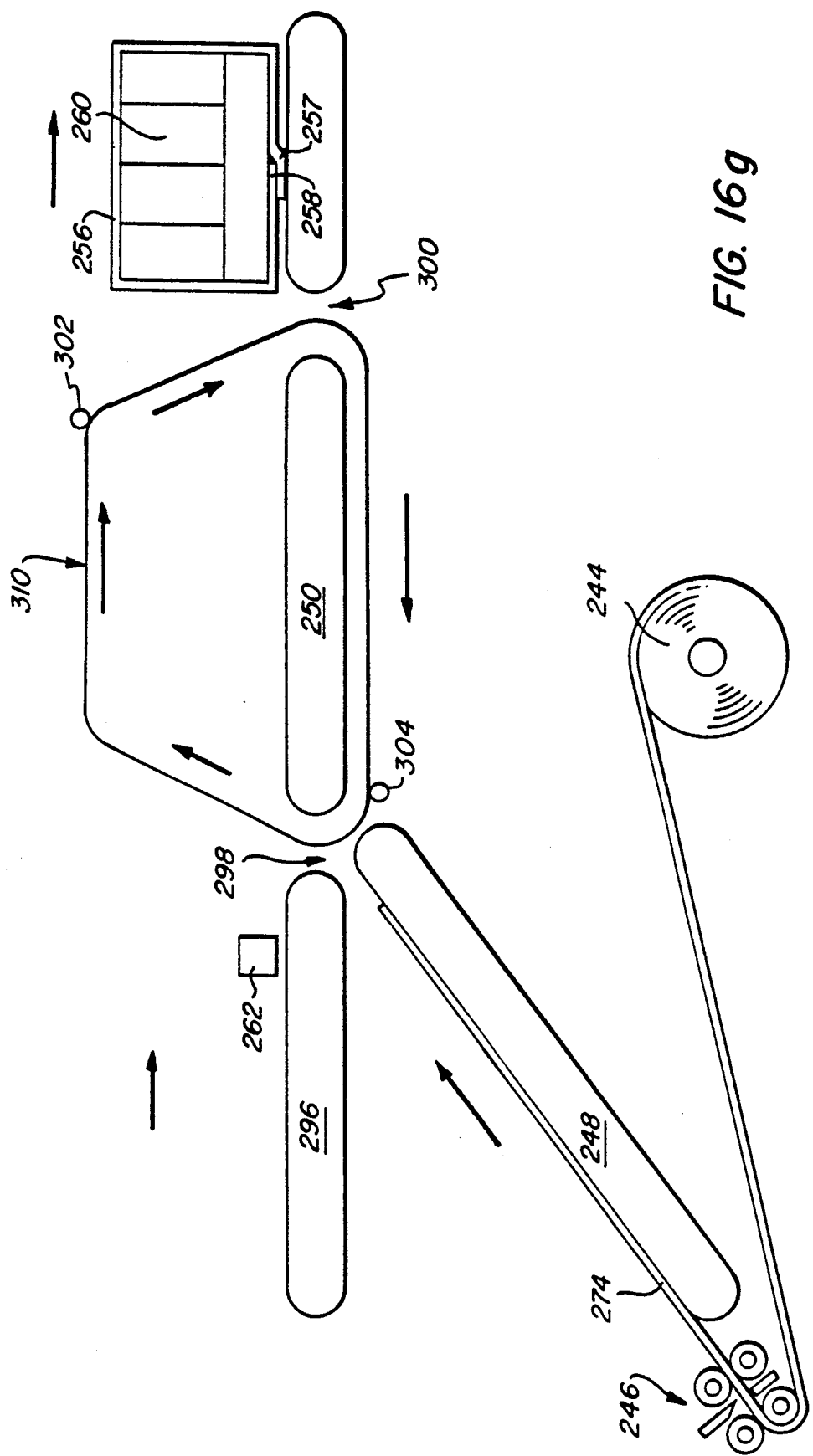

Wrapping servomotor 254 is accelerated from speed SW2 at 528 beginning at time t=t9 to speed SW3 at t=t10 at 530 to carry wrap bar 304 through passageway 300 ahead of loaded tray 260 to permit tray leading edge of film sheet to be pulled in a fold under tray 260 (FIG. 16f). The wrapping operation for tray 260 is completed by decelerating wrapping servomotor 254 from SW3 at 532 at time t=t14 down to zero again at 534 to await the next wrapping operation (FIG. 16g).

Although specific values for SFF1, SFF2, SFF3, SW1, SW2, SW3, and times t=t1 through t14 have not been given, it is understood that these parameters can be readily changed through routine programming and use of PC 120 and programmable logic controller 130 to accommodate a wide range of package sizes and configurations as well as a variety of machine processing speeds SM. When combined with the same programmability and changeability for the grouper 110 as described above, it can be readily seen that with a minimum of changeout parts (i.e., deadplate 224) the tray packer shrink wrapper of the present invention can efficiently accommodate a wide variety of batches of different sized articles and different group or array configurations.

The wrapped tray loaded articles are then conveyed through a shrink tunnel wherein the shrinking operation is carried out as depicted at 66 in FIG. 1.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

We claim:

1. A method for generating at least one discrete group of articles from at least one row of articles being conveyed in single file along a conveyor path in a direction from an upstream towards a more downstream position, said method comprising the steps of:

(a) pushing a leading portion of said row onto a stationary section of said conveyor path;

(b) accelerating said leading portion further across said stationary section relative to a remaining portion of said row to generate a gap between said leading and remaining portions and thereby form a discrete group from said leading portion, said accelerating step comprising i) inserting at least two projecting means into said leading portion between adjacent articles on said stationary section, one said projecting means being leading and the other said projecting means being trailing, the leading projecting means being inserted between adjacent articles at a point downstream from said trailing projecting means by a distance defining a predetermined number of articles in said group to be generated, whereby a defined number of articles comprising said group to be generated is disposed between the leading and trailing projecting means, and ii) accelerating said leading projecting means relative to said trailing projecting means to propel any articles downstream of said leading projecting means over said stationary section further along said conveyor path in a downstream direction, while the remainder of articles in said row upstream of said trailing projecting means and said defined group of articles immediately downstream of said trailing projecting means is not subjected to such acceleration;

(c) after said accelerating step, inserting an additional projecting means into remaining articles of said leading portion at a point upstream of said trailing projecting means, said additional projecting means being separated from said trailing projecting means by said distance;

(d) also after said acceleration step, withdrawing said leading projecting means from said row, whereby said trailing projecting means becomes a successive leading projecting means and said additional projecting means becomes a successive trailing projective means with a successive defined discrete group of articles therebetween;

(e) accelerating said successive leading projecting means relative to said successive trailing projecting means to propel said defined discrete group over said stationary section further along in said downstream direction to separate said successive defined discrete group from said remainder of articles in said row in accordance with paragraph ii) of step (b); and (f) repeating paragraph ii) of step (b) and steps (c), (d) and (e) by continuing to insert successive additional projecting means and accelerating each successive defined discrete group in turn downstream of each successive leading projecting means over said stationary section to continuously separate discrete groups from said row, and wherein said articles are being pushed onto said stationary portion in a downstream direction at a predetermined conveyor speed SM, and each said successive trailing projecting means is moved in said downstream direction at a speed SG1 substantially equal to said speed SM, and each successive trailing projecting means after moving at speed SG1 becomes a successive leading projecting means and is accelerated to a speed SG2 to separate the successive defined discrete group downstream thereof from said row, SG2 being greater than SG1, and wherein after each successive leading projecting means is accelerated to speed SG2 to separate each successive group, such speed SG2 is maintained along said stationary section to provide a gap of preselected length between each group, and wherein each successive group is propelled downstream by its corresponding successive leading projecting means until said corresponding successive leading projecting means is withdrawn from said row, and said group is conveyed further downstream by additional conveying means after said corresponding successive leading projecting means is withdrawn, and wherein each successive leading projecting means is decelerated to a speed SG3 less than SG2 before being withdrawn from said row to permit a relatively smooth transition for said corresponding group from being propelled by said successive leading projecting means to being conveyed further along said conveyor direction by said additional conveying means.

2. The method of claim 1, wherein each said projecting means is inserted in said row at an insertion point relatively upstream of a point where said projecting means becomes a successive leading projecting means, and each said leading projecting means after withdrawal is moved back upstream for reinsertion at said insertion point to become a successive trailing projecting means.

3. The method of claim 2, wherein each successive leading projecting means is accelerated to speed SG4 after being withdrawn and said successive leading projecting means is moved in a relatively upstream direction to reposition said successive leading projecting means for reinsertion into said row to become a successive trailing projecting means.

4. The method of claim 1, wherein each successive leading projecting means is withdrawn from said row at about the same time as the insertion of said additional projecting means, such that no more than two projecting means are inserted in the leading portion at any one time.

5. The method of claim 1, wherein each successive group after it has been separated from said row is pushed further along said conveyor path.

6. A method for forming groups of articles from a row of articles being conveyed from an upstream towards a downstream position at a predetermined machine speed, said method comprising the steps of:
   (a) inserting pin means into said row between a pair of adjacent articles, said pin means being inserted at a point in said row with a first group of a predetermined number of articles downstream of said pin means;
   (b) after said pin means is substantially completely inserted into said row, moving said pin means in a downstream direction at a first speed being substantially the same as said predetermined machine speed to restrain articles upstream of said pin means from advancing at a speed greater than said machine speed and to propel said first group of articles downstream of said pin means at a speed substantially equivalent to said first speed;
   (c) after said pin means has advanced at said first speed, inserting subsequent pin means upstream of said pin means to project into said row between another pair of adjacent articles, said subsequent pin means being inserted at another point in said row with a second group of said predetermined number of articles downstream of said subsequent pin means and between said pin means and said subsequent pin means;
   (d) after said subsequent pin means has been inserted, accelerating said pin means to a second speed greater than said first speed to accelerate said first group of articles to said second speed in said downstream direction and pull a gap between said first group of articles and said row at the point where said pin means was inserted, and
   (e) while said pin means is being accelerated and moved at said second speed, continuing to move said subsequent pin means at said first speed to restrain articles upstream of said subsequent pin means from advancing at a speed greater than said machine speed and also to propel said second group of articles downstream of said subsequent pin means at a speed substantially equivalent to said first speed, whereby a subsequent pin means moving downstream at substantially said machine speed is substantially always in contact with said row.

7. The method of claim 6, further comprising the steps of:
   (a) after said pin means has moved to separate said first group of articles from said row of articles by a gap of predetermined length, withdrawing said pin means from said row;
   (b) after said gap of predetermined length has been pulled by said pin means, and after a further subsequent pin means has been inserted in said row upstream of said subsequent pin means, accelerating said subsequent pin means to said second speed for pulling said gap for said second group; and
   (c) continuing to successively insert yet further subsequent pin means in sequence upstream of downstream pin means and accelerating each said downstream pin means in turn relative to its upstream pin means to successively generate groups of said articles.

8. A method for receiving a stream of uniformly shaped articles in random placement from an input conveyor and forming said articles into orderly arrays regularly spaced one from the other along an output conveyor, said method comprising the steps of:
   (a) conveying said articles along a conveyor path under a line feed pressure in a direction from an upstream towards a more downstream position;
   (b) introducing said articles under said line feed pressure to a plurality of parallel channels of substantially equal width formed by opposing channel sidewalls separated by a uniform width for receiving said articles, said sidewalls aligned with and disposed in said conveyor path for separating said articles into uniformly spaced rows;
   (c) inserting at least a pair of finger means sets into said channels, the finger means sets extending inwardly between adjacent articles in each of said channels, there being a leading and a trailing finger means in each channel, said leading finger means being aligned in a set in a cross conveyor direction and said trailing finger means being likewise aligned in another set also in a cross conveyor direction, said pair of finger means sets being separated from each other in a conveyor path direction by a preselected distance defining therebetween the size of the array to be generated;

(d) accelerating a downstream-most one of said finger means sets in a downstream direction relative to an upstream-most one of said finger means sets to push an array of articles in said channels and downstream of said downstream-most finger means sets away from a remainder of said articles retained by said upstream-most finger means sets and thereby separate said array therefrom;

(e) after said accelerating step, withdrawing said downstream-most finger means sets from said channels and returning said downstream-most finger means to a point upstream of said other finger means sets and reinserting into said channels for a subsequent pushing step; and (f) repeating steps (d) and (e) in a cyclical fashion to continuously generate arrays of articles from said stream of articles being infed, and wherein said accelerating step is performed by accelerating said finger means along a section of said channels having a floor surface that is held stationary with respect to the conveyor path direction, whereby a downstream force impelling said array downstream is limited solely to the force imparted to said arrays by said finger means sets.

9. The method of claim 8, wherein said stream of articles may be supplied to said input conveyor in a plurality of batches, said articles in any one batch having substantially uniform diameters and heights but said articles potentially varying in diameter or height from batch to batch, the method comprising the additional steps of:

(a) adjusting the distance between channel sidewalls to correspond to the diameter of the articles in the batch to be processed;

(b) adjusting the lateral spacing between finger means on both the leading and trailing finger means sets to correspond to the spacing between channel sidewalls;

(c) adjusting the floor portion to correspond to the number of channels; and (d) repeating steps (d) and (e) of claim 8 to continuously generate successive arrays of articles.

10. Apparatus for forming a discrete group of articles from a row of articles being conveyed along a conveyor path in a conveyor direction from an upstream towards a more downstream position, said apparatus comprising:

(a) means for pushing a leading portion of said row onto a stationary section of said conveyor path; and (b) means for accelerating said leading portion further across said stationary section relative to a remaining portion of said row to generate a gap between said leading and remaining portions and thereby form a discrete group from said leading portion, the accelerating means comprising i) first and second projecting means for engaging articles of said row, said first and second projecting means for alternate insertion between said leading and remaining portions of said row to generate said gap, and ii) first and second motor means for alternately accelerating said first and second projecting means respectively to generate said gaps.

11. Apparatus for forming discrete groups of articles from a row of articles being conveyed along a conveyor path in a conveyor direction from an upstream towards a more downstream position, said apparatus comprising:

(a) stationary plate means disposed in said conveyor path, said plate means being held fixed in a stationary position with respect to said conveyor direction, said plate means having an upwardly disposed surface disposed in said conveyor path for receiving thereon a leading portion of said row being pushed thereacross by line feed pressure introduced by a line feed pressure source disposed in said path upstream of said stationary plate means;

(b) at least a pair of pins movable along a pin path having a pin path portion adjacent said stationary plate means in said conveyor direction, said pins being extendable into said leading portion to engage said articles on said surface to either propel any articles immediately downstream of said pins across said plate means in said downstream direction or restrain any articles immediately upstream of said pins from being pushed across said plate means at a speed greater than a first speed at which the pins move along said pin path, said pins for projecting into said leading portion between adjacent articles received onto said plate, at least one said pin for being inserted as a leading pin and at last one other said pin for being inserted as a trailing pin, the leading pin for being inserted at a point downstream from said trailing pin by a distance defined by the number of articles in said group to be generated, whereby a defined group of articles can be positioned between the leading and trailing pins;

(c) means for moving said leading pin at a constant second speed greater than said first speed of said trailing pin to propel a group of articles downstream of said leading pin over said stationary section further along in said conveyor direction, while restraining the remainder of articles in said row upstream of said trailing pin and said defined group of articles immediately downstream of said trailing pin against acceleration; and (d) means for moving said leading pin for a period of time at a constant third speed less than said second speed but greater than said first speed to deposit the propelled group of articles at a position downstream of said leading pin, whereby a group of articles can be generated by the action of said pins.

12. Apparatus for forming a group of articles from at least one row of articles being conveyed along a conveyor path from an upstream towards a more downstream position, said apparatus comprising:

(a) at least first and second closed loop means having associated therewith first and second article engaging members respectively, each said loop means having a loop path portion oriented to move its corresponding article engaging member in the same direction as said articles being conveyed along said conveyor path, said loop path portion being aligned to permit said member to engage articles in said row between articles along said loop path portion;

(b) first and second variable speed drive means for continuously driving both said engaging members around said loop means in a cyclical fashion, said first and second engaging members being drivable at different speeds relative to each other; and (c) control means operatively coupled to said variable speed drive means for controlling said drive means in a spaced relationship relative to each other such that at least once during a single cycle, both said article engaging members are engaged with said row with a selected one of said engaging members being engaged at a position downstream from said other engaging member, and said selected engaging member can be accelerated relative to said other engaging member to accelerate any articles downstream of said selected member further downstream sufficiently to form a group of articles separate from any articles remaining in said line, and wherein said first and second closed loop means comprise first and second chain means supported on corresponding first and second sprocket means sets, and said first and second article engaging members include at least first and second pin means fixedly mounted to said first and second chains respectively; said first and second variable speed drive means include first and second servomotor means; and said control means includes computer control means for directing the action of said servomotor means to cycle said pins in accordance with pin movement data stored in a memory operatively connected to said computer control means.

13. Apparatus of claim 12, wherein said first and second pin means each includes a pair of pins mounted on its corresponding chain means, said pin pair being mounted equidistant from each other around said chain means.

14. The apparatus of claim 13 further including stationary plate means disposed in said path for receiving a leading portion of said row being pushed across at least a portion of said plate by line pressure imparted to said row by a line pressure source upstream of said plate.

15. The apparatus of claim 14 further comprising at least one set of parallel lane guides in said conveyor path having sidewalls for forming a channel to receive said articles and aligning said articles single file in a relatively straight row, and said stationary plate means forms the floor portion of said channel, said plate means forming at least one slot aligned with said channel, and said first and second chains means are so positioned with respect to said slot to extend said first and second pin means into said channel to group articles in said channel.

16. The apparatus of claim 15, wherein uniformly shaped articles are received in random placement from an input conveyor for forming into a plurality of parallel rows extending widthwise of said conveyor path, and said apparatus comprises a plurality of sets of parallel lane guides forming a plurality of channels also spaced widthwise transversely across said conveyor path for receiving said articles to form said rows, and said stationary plate means has a predetermined length and a width corresponding to the number of channels, said stationary plate means forming a plurality of lengthwise slots aligned with said lane guides, there being at least one slot per channel, and said first and second pin means include first and second pin support members extending widthwise under said stationary plate means, each said pin support member having means for mounting a plurality of upwardly extending pins, there being at least one pin extending through each slot into each channel, whereby there are a plurality of channels having pins extending therein for grouping articles.

17. The apparatus of claim 16, wherein said stationary plate means is removable for replacement with another stationary plate means having a number and orientation of slots corresponding to different lane guide positions, and said mounting means is adjustable for varying the widthwise distance between pins on each said pin support member, whereby different batches of articles varying in effective diameter from batch to batch can be grouped by replacing the stationary plate means with another stationary plate means having appropriately orientated slots, and adjusting the widthwise distance between pins to match slots in said another stationary plate means.

18. The apparatus of claim 17, further including at least two deadplates with varying slot patterns therein for interchanging into said apparatus for grouping different batches of articles of differing effective diameter.

19. Apparatus for grouping articles being conveyed in bulk along a conveyor path in a row under line feed pressure at a machine speed from a generally upstream position to a generally more downstream position, said apparatus comprising:
(a) a deadplate disposed in said path having an upwardly facing surface for receiving thereon said articles being pushed thereacross, said deadplate having at least one lengthwise slot formed therein aligned with said row;
(b) a pair of sidewalls spaced apart in a widthwise direction and positioned adjacent said deadplate for forming a channel to receive a row of articles;
(c) at least a pair of pins for projecting through said deadplate slot into said row of articles on said plate between adjacent articles in said row to engage said articles, each said pin means being movable at a velocity independent of the other pin for varying the distance between pins in accordance with a prechosen program, each said pin further being movable around a closed path unique to that pin, one side of each closed pin path being aligned with said slot to permit said pin to engage any articles in said channel and either restrain articles upstream of said pin from moving at a speed greater than said pin or push articles downstream of said pin at the speed of said pin, each said closed pin path having associated therewith at least one pin;
(d) a pair of means for moving each said pin around its associated closed pin path, one said moving means for each pin, each said moving means being operable independently of the other moving means;
(e) control means operatively connected to said pair of moving means for operating said moving means to move said pins in accordance with the following program:
  (i) move a first pin around its associated closed pin path to insert said first pin in said row of articles on said deadplate;
  (ii) move a second pin around its associated closed pin path to insert said second pin in said row on said deadplate at a point upstream of said first pin;
  (iii) after said second pin has been so inserted, accelerate said first pin in a generally downstream direction with respect to said second pin to thereby push any articles further over said deadplate downstream of said first pin and away from remaining articles in the row;
  (iv) while said first pin is being so accelerated, retain said second pin at approximately said machine speed to restrain said articles upstream of said second pin from being accelerated beyond conveyor speed and to permit said group of articles on said deadplate to remain on said deadplate and continue to move downstream at a speed no greater than the speed of said second pin;

(v) move said first pin at an accelerated speed for a sufficient time to separate said group sufficiently from said remaining articles, and then move said first pin further around its associated closed pin path to withdraw said first pin from said article row and return said first pin towards a more upstream position for reinsertion into said row upstream of said second pin;

(vi) after at least one pin has been inserted into said row upstream of said second pin, accelerate said second pin to separate another group of articles from said row; and (vii) continue to accelerate successive ones of downstream pins in a cyclical manner to sweep successive groups across said deadplate and generate successive groups, while continuing to maintain successive ones of said upstream pins to restrain the remaining articles of the row on said deadplate.

20. The apparatus of claim 19, wherein said control means is a computer control means and said apparatus further comprises an input means operatively connected to said control means for receiving information defining the number of articles in said group to be generated.

21. The apparatus of claim 20, wherein there are at least two pins A for the first pin path and at least two pins B for the second pin path, and said pins engage said articles in said row in the cycle A,B,A,B,...,A,B for at least a portion of said apparatus operation.

22. The apparatus of claim 21, wherein there is a pin pitch distance between successive pins inserted into said row, and said pin pitch distance is controlled by said computer control means as a function of time, position, the number of articles per group, and the effective diameter of said articles.

23. A method for forming groups of articles from a row of articles being conveyed from an upstream towards a downstream position at a predetermined machine speed, said method comprising the steps of:

(a) inserting pin means into said row between a pair of adjacent articles, said pin means being inserted at a point in said row with a first group of a predetermined number of articles downstream of said pin means;

(b) moving said pin means substantially solely in a downstream direction for a first period of time at a first speed to restrain articles upstream of said pin means from advancing at a speed greater than said first speed and to propel said first group of articles downstream of said pin means at said first speed;

(c) after said pin means has advanced at said first speed, inserting subsequent pin means upstream of said pin means to project into said row between another pair of adjacent articles, said subsequent pin means being inserted at another point in said row with a second group of said predetermined number of articles downstream of said subsequent pin means;

(d) moving said subsequent pin means substantially solely in said downstream direction at said first speed to restrain articles upstream of said subsequent pin means from advancing at a speed greater than said first speed and to propel said second group of articles downstream of said subsequent pin means at said first speed; and (e) after said pin means has moved at said first speed for said first period of time, accelerating said pin means to a second speed greater than said first speed to accelerate said first group of articles to said second speed in said downstream direction and pull a gap between said first group of articles and said row at the point where said pin means was inserted.

24. The method of claim 23, wherein said first speed is substantially equal to said machine speed.

* * * * *